US012574553B2

(12) United States Patent (10) Patent No.: US 12,574,553 B2
Hendry (45) Date of Patent: Mar. 10, 2026

(54) MEDIA FILE PROCESSING METHOD AND DEVICE

(71) Applicant: LG Electronics Inc., Seoul (KR)

(72) Inventor: Hendry Hendry, Seoul (KR)

(73) Assignee: LG Electronics Inc., Seoul (KR)

( * ) Notice: Subject to any disclaimer, the term of this patent is extended or adjusted under 35 U.S.C. 154(b) by 33 days.

(21) Appl. No.: 18/265,620

(22) PCT Filed: Dec. 8, 2021

(86) PCT No.: PCT/KR2021/018526

§ 371 (c)(1),
(2) Date: Jun. 6, 2023

(87) PCT Pub. No.: WO2022/139261

PCT Pub. Date: Jun. 30, 2022

(65) Prior Publication Data

US 2024/0031622 A1 Jan. 25, 2024

Related U.S. Application Data

(60) Provisional application No. 63/128,197, filed on Dec. 21, 2020.

(51) Int. Cl.
H04N 21/2343 (2011.01)
H04N 19/105 (2014.01)
(Continued)

(52) U.S. Cl.
CPC ........... H04N 19/70 (2014.11); H04N 19/105 (2014.11)

(58) Field of Classification Search
CPC .. H04N 19/70; H04N 21/2343; H04N 21/236; H04N 21/434; H04N 21/4402; H04N 21/85406; H04N 21/8456
See application file for complete search history.

(56) References Cited

U.S. PATENT DOCUMENTS

2016/0234516 A1* 8/2016 Hendry .................. H04N 19/70
2016/0373771 A1* 12/2016 Hendry .................. H04N 19/30
(Continued)

FOREIGN PATENT DOCUMENTS

GB 2599171 A * 3/2022 ............. H04N 19/46
WO WO-2021022267 A2 * 2/2021 ........... H04N 19/187
WO WO-2021170091 A1 * 9/2021 ............. H04N 19/70

OTHER PUBLICATIONS

"Overview of the Multiview and 3D Extensions of High Efficiency Video Coding"—Tech et al., IEEE Transactions on Circuits and Systems for Video Technology, vol. 26, No. 1, Jan. 2016. (Year: 2016).*

(Continued)

*Primary Examiner* — Mainul Hasan
(74) *Attorney, Agent, or Firm* — Fish & Richardson P.C.

(57) ABSTRACT
A media file generation method according to the present document comprises the steps of: deriving information related to an operating point list; configuring a group related to an operating point including information related to the operating point list; and generating a media file including the group related to the operating point, wherein the information related to the operating point list includes specific information for indicating that the operating point list contains all operating points that are present in a sample entry of a track indicating a bitstream.

10 Claims, 14 Drawing Sheets

(51) Int. Cl.
  H04N 19/70      (2014.01)
  H04N 21/236      (2011.01)

(56)                References Cited

U.S. PATENT DOCUMENTS

| | | | |
|---|---|---|---|
| 2018/0184098 A1* | 6/2018 | Denoual ................ | H04N 19/30 |
| 2019/0075306 A1* | 3/2019 | Hendry ................. | H04N 19/39 |
| 2022/0086494 A1* | 3/2022 | Wang ................... | H04N 19/172 |
| 2022/0103865 A1* | 3/2022 | Wang ................... | H04N 19/132 |
| 2022/0239949 A1* | 7/2022 | Hannuksela ......... | H04N 19/105 |
| 2023/0345054 A1* | 10/2023 | Chen ..................... | H04N 19/46 |

OTHER PUBLICATIONS

"File Format for Scalable Video Coding"—Amon et al., IEEE Transactions on Circuits and Systems for Video Technology, vol. 17, No. 9, Sep. 2007 (Year: 2007).*

* cited by examiner

FIG. 3

Acquire/Receive a media file including VvcOperatingPointsRecord and/or OperatingPointGroupBox ~S900

Parse/Obtain the VvcOperatingPointsRecord and/or OperatingPointGroupBox ~S910

Derive information related to a list of operating points    ~S1000

Configure an operating point related group    ~S1010

Generate a media file    ~S1020

MEDIA FILE PROCESSING METHOD AND DEVICE

CROSS-REFERENCE TO RELATED APPLICATIONS

This application is a National Stage application under 35 U.S.C. § 371 of International Application No. PCT/KR2021/018526, filed on Dec. 8, 2021, which claims the benefit of U.S. Provisional Application No. 63/128,197, filed on Dec. 21, 2020. The disclosures of the prior applications are incorporated by reference in their entirety.

BACKGROUND OF THE DISCLOSURE

Field of the Disclosure

The present disclosure relates to an image coding technology, and, most particularly, to a method for processing a media file for image information coded in an image coding system and a apparatus of the same.

Related Art

The demands for high-resolution and high-quality images, such as an ultra-high definition (UHD) image and a high-definition (HD) image, are recently increasing in various fields. As image data become high resolution and high quality, the amount of information or the number of bits that is relatively transmitted is increased compared to the existing image data. Accordingly, if image data is transmitted using a medium, such as the existing wired or wireless wideband line, or image data are stored using the existing storage medium, transmission costs and storage costs are increased.

Accordingly, high-efficiency image compression technology is required to effectively transmit, store, and playback information of high-resolution and high-quality images.

SUMMARY OF THE DISCLOSURE

Technical Solutions

According to an embodiment of the present document, provided herein is a method and apparatus for efficiently storing and transmitting video/image data.

According to an embodiment of the present document, provided herein is a method and apparatus for configuring (or forming) a file format that can be used by supporting VVC.

According to an embodiment of the present document, provided herein is a method and apparatus for configuring an operating point related group and generating a media file in order to store and transmit video/image data.

According to an embodiment of the present document, provided herein is a method and apparatus for preventing a problem caused by not being clear whether an operating point list includes an operating point present in a sample entry of a track.

According to an embodiment of the present document, provided herein is a method for generating a media file performed by a media file generating apparatus.

According to an embodiment of the present document, provided herein is a media file generating apparatus generating a media file.

According to an embodiment of the present document, provided herein is a method for processing a media file performed by a media file processing apparatus.

According to an embodiment of the present document, provided herein is a media file processing apparatus processing a media file.

Effects of the Disclosure

According to an embodiment of the present document, video/image data may be efficiently stored and transmitted.

According to an embodiment of the present document, a file format which can be used by supporting VVC may be configured (or formed).

According to an embodiment of the present document, an operating point related group may be configured and a media file may be generated in order to store and transmit video/image data.

According to an embodiment of the present document, a problem caused by not being clear whether an operating point list includes an operating point present in a sample entry of a track may be prevented.

According to an embodiment of the present document, an operating point determination process can be made simple and clear.

BRIEF DESCRIPTION OF THE DRAWINGS

FIG. 3 is a diagram schematically illustrating a configuration of a video/image decoding apparatus to which embodiments of the present document may be applied.

FIG. 5 shows an example of a method for generating a media file to which the embodiment proposed in the present disclosure is applied.

DESCRIPTION OF EXEMPLARY EMBODIMENTS

Figure 1:
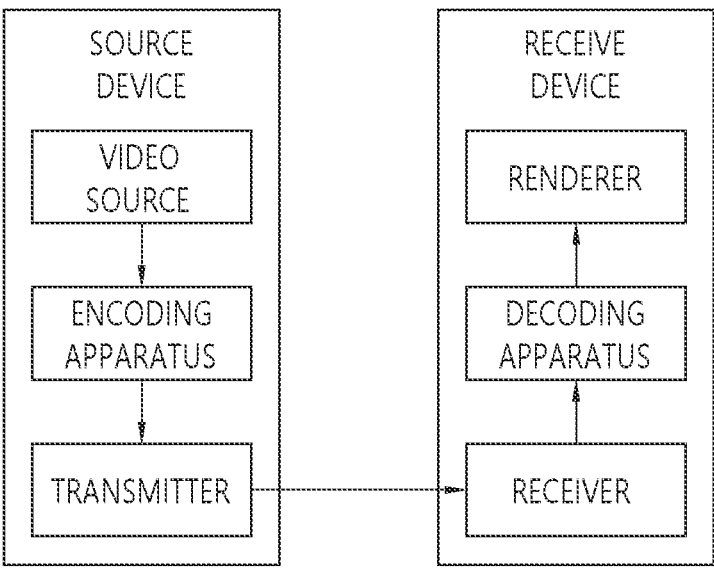
FIG. 1 schematically shows an example of a video/image coding system to which embodiments of the present document may be applied.

The present document may be modified in various forms, and specific embodiments thereof will be described and illustrated in the drawings. However, the embodiments are not intended for limiting the document. The terms used in the following description are used to merely describe specific embodiments, but are not intended to limit the document. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the document are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the document without departing from the concept of the document.

Hereinafter, preferred embodiments of the present document will be described in more detail with reference to the attached drawings. Hereinafter, the same reference numbers will be used throughout this specification to refer to the same components and redundant description of the same component may be omitted.

FIG. 1 schematically illustrates an example of a video/image coding system to which embodiments of the present document may be applied.

Referring to FIG. 1, a video/image coding system may include a first apparatus (a source apparatus) and a second apparatus (a receiving apparatus). The source apparatus may deliver encoded video/image information or data in the form of a file or streaming to the receiving apparatus via a digital storage medium or network.

The source apparatus may include a video source, an encoding apparatus, and a transmitter. The receiving apparatus may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate apparatus or an external component.

The video source may acquire video/image through a process of capturing, synthesizing, or generating the video/image. The video source may include a video/image capture apparatus and/or a video/image generating apparatus. The video/image capture apparatus may include, for example, one or more cameras, video/image archives including previously captured video/images, and the like. The video/image generating apparatus may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving apparatus through a digital storage medium or a network in the form of a file or streaming. The digital storage medium may include various storage mediums such as USB. SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

This document relates to video/image coding. For example, the methods/embodiments disclosed in this document may be applied to a method disclosed in the versatile video coding (VVC), the essential video coding (EVC) standard, the AOMedia Video 1 (AV1) standard, the 2nd generation of audio video coding standard (AVS2), or the next generation video/image coding standard (ex. H.267 or H.268, etc.).

The present disclosure provides various embodiments related to video/image coding, and unless otherwise explicitly stated, the embodiments may be performed in combination with each other.

In the present document, a video may mean a group of a series of images over time. A picture generally means a unit representing one image in a specific time period, and sub-picture/slice/tile are units constituting a part of a picture in coding. The subpicture/slice/tile may include one or more coding tree units (CTUs). One picture may be configured of one or more subpictures/slices/tiles. One picture may be configured of one or more subpictures/slices/tiles. One picture may be configured of one or more tile groups. One tile group may include one or more tiles. A brick may represent a rectangular region of CTU rows within a tile in a picture. A tile may be partitioned to a plurality of bricks, and each brick may be configured of one or more CTU rows within the tile. A tile that is not partitioned to a plurality of bricks may also be referred to as a brick. A brick scan may represent a particular sequential ordering of CTUs that partition a picture. Herein, the CTUs may be aligned by CTU raster scanning in a brick, bricks in a tile may be consecutively (or continuously) aligned by a raster scan of the bricks of the tile, and tiles in a picture may be consecutively aligned by a raster scan of the tiles of the picture. A subpicture may represent a rectangular region of one or more slices in a picture. That is, a subpicture may include one or more slices that collectively cover a rectangular region of a picture. A tile is a particular tile column and a rectangular region of CTUs within a particular tile column. The tile column is a rectangular region of the CTUs, and the rectangular region as a same height as a height of the picture, and a width of the rectangular region may be specified by syntax elements in a picture parameter set. The tile row is a rectangular region of CTUs, and the rectangular region has a width that is specified by the syntax elements in a picture parameter set and a height that is the same as the height of the picture. A tile scan may represent a particular sequential ordering of CTUs partitioning a picture, the CTUs may be consecutively aligned by a CTU raster scan in the tile, and tiles in a picture may be consecutively aligned by a raster scan of the tiles of the picture. A slice may include an integer number of bricks of a picture, wherein the integer number of bricks may belong to a NAL unit. A slice may be configured of a plurality of complete tiles or may be a consecutive sequence complete bricks of on tile. In the present disclosure, a tile group and a slice may be interchangeably used. For example, in the present disclosure, a tile group/tile group header may also be referred to as a slice/slice header.

A pixel or a pel may mean the smallest unit constituting one picture (or image). Also, 'sample' may be used as a term corresponding to the pixel. A sample may generally represent a pixel or a value of a pixel and may represent only a pixel/pixel value of the luma component or only a pixel/pixel value of the chroma component.

A unit may represent a basic unit of image processing. The unit may include at least one of a specific region of the picture and information related to the region. One unit may include one luma block and two chroma (e.g., cb, cr) blocks. The unit may be used interchangeably with terms such as block or area in some cases. In a general case, an M×N block may include samples (or sample arrays) or a set (or array) of transform coefficients of M columns and N rows.

In this document, the term "A or B" may mean "only A", "only B", or "both A and B". In other words, in this document, the term "A or B" may be interpreted to indicate "A and/or B". For example, in this document, the term "A, B or C" may mean "only A", "only B", "only C", or "any combination of A. B and C".

A slash "/" or a comma used in this document may mean "and/or". For example, "A/B" may mean "A and/or B". Accordingly, "A/B" may mean "only A", "only B", or "both A and B". For example, "A, B. C" may mean "A, B or C".

In this document, "at least one of A and B" may mean "only A", "only B", or "both A and B". Further, in this document, the expression "at least one of A or B" or "at least one of A and/or B" may be interpreted the same as "at least one of A and B".

Further, in this document, "at least one of A, B and C" may mean "only A". "only B", "only C", or "any combination of A, B and C". Further, "at least one of A, B or C" or "at least one of A, B and/or C" may mean "at least one of A. B and C".

Further, the parentheses used in this document may mean "for example". Specifically, in the case that "prediction (intra prediction)" is expressed, it may be indicated that "intra prediction" is proposed as an example of "prediction". In other words, the term "prediction" in this document is not limited to "intra prediction", and it may be indicated that "intra prediction" is proposed as an example of "prediction". Further, even in the case that "prediction (i.e., intra prediction)" is expressed, it may be indicated that "intra prediction" is proposed as an example of "prediction".

Technical features that are individually described in one drawing in this document may be implemented individually or may be implemented at the same time.

The following Figures are made to explain specific examples of the present document. Since the names of specific apparatuses or names of specific signals/messages/fields described in the figures are provided as examples, the technical features of the present document are not limited to the specific names used in the figures below.

Figure 2:
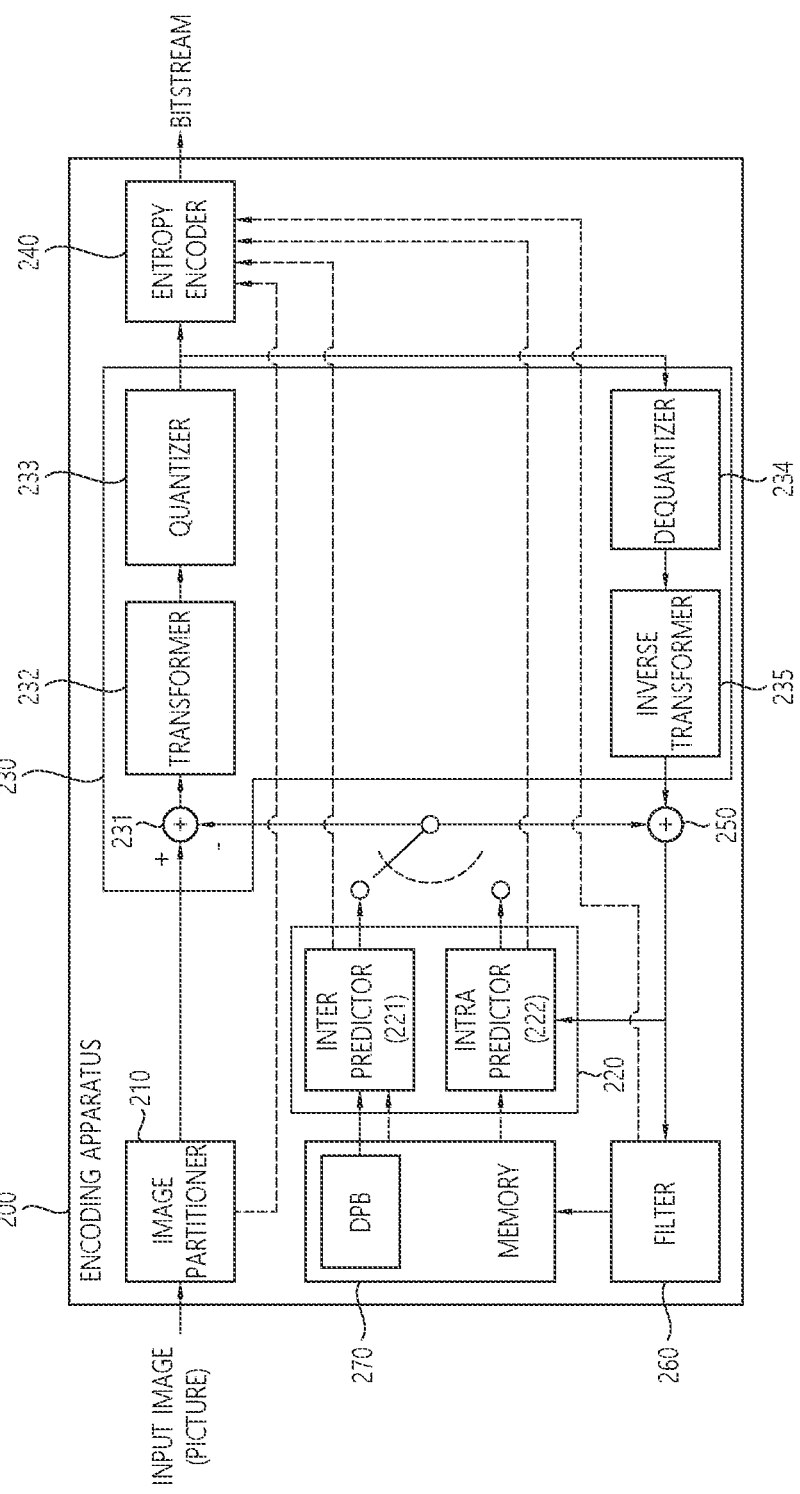
FIG. 2 is a diagram schematically illustrating a configuration of a video/image encoding device to which embodiments of the present document may be applied.

FIG. 2 is a schematic diagram illustrating a configuration of a video/image encoding apparatus to which the embodiment(s) of the present document may be applied. Hereinafter, the encoding apparatus may include an image encoding apparatus and/or a video encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a part for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
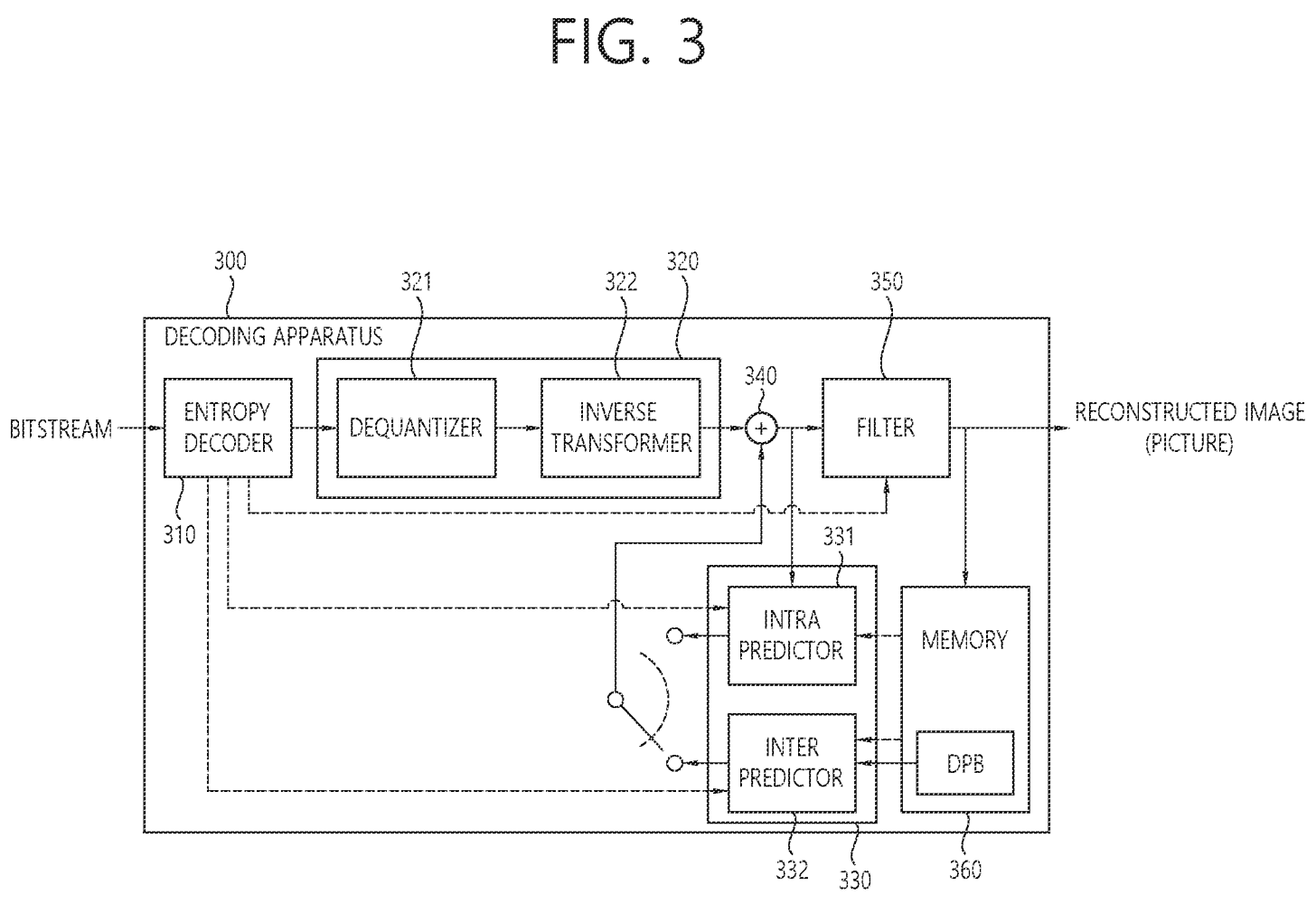

FIG. 3 is a schematic diagram illustrating a configuration of a video/image decoding apparatus to which the embodiment(s) of the present document may be applied. Hereinafter, the decoding apparatus may include an image decoding apparatus and/or a video decoding apparatus.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component.

Figure 5:
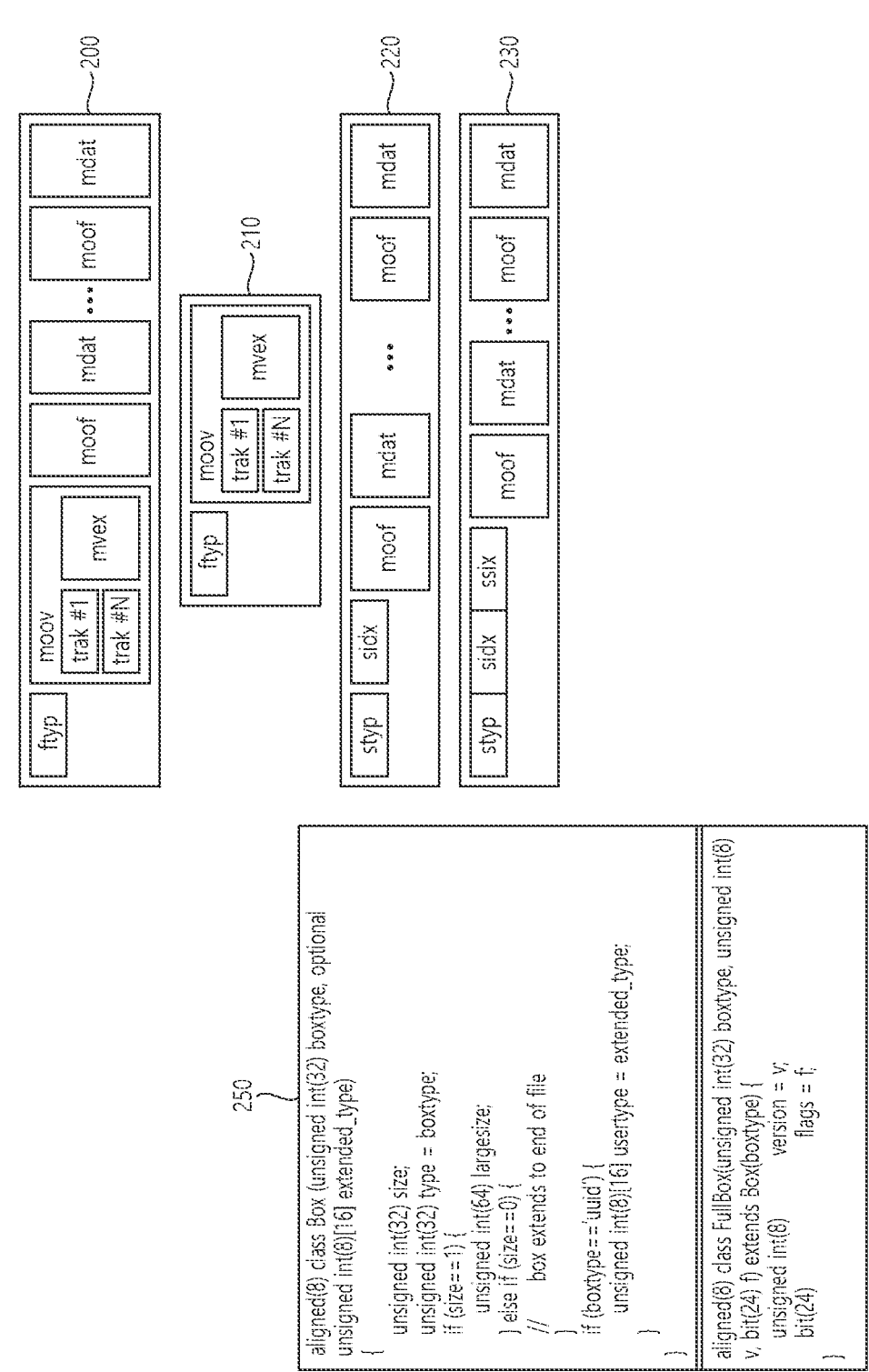
FIG. 5 and FIG. 6 show an example of a structure of a media file.

When a bitstream including video/image information is input, the decoding apparatus 300 may reconstruct an image corresponding to a process in which the video/image information is processed in the encoding apparatus of FIG. 5. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the inter predictor 332 and the intra predictor 331.

Figure 4:
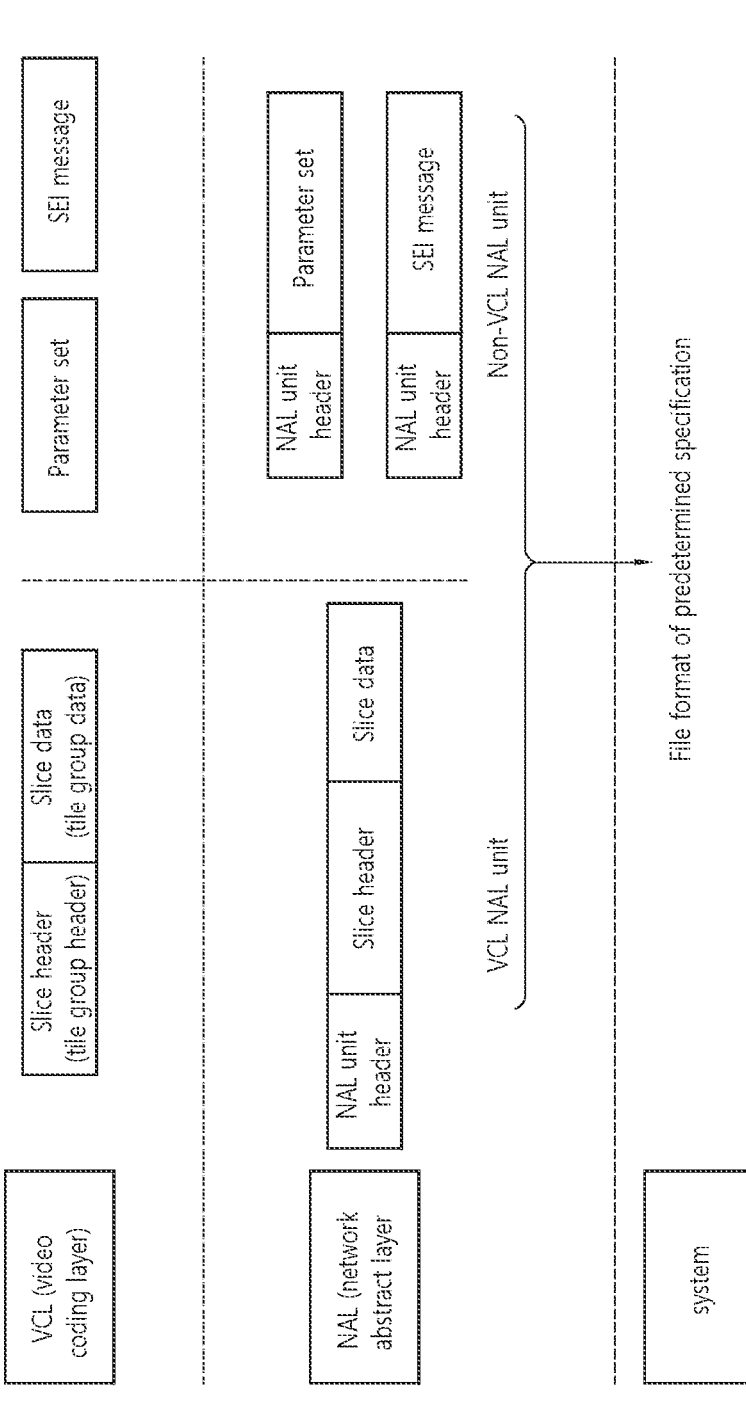
FIG. 4 shows an example of a hierarchical structure for coded video/image.

FIG. 4 shows an exemplary hierarchical structure for a coded video/image.

Referring to FIG. 4, coded image/video is divided into a video coding layer (VCL) that handles the decoding process of the image/video and itself, a subsystem that transmits and stores the coded information, and a network abstraction layer (NAL) in charge of function and present between the VCL and the subsystem.

In the VCL, VCL data including compressed image data (slice data) is generated, or a parameter set including a picture parameter set (PSP), a sequence parameter set (SPS), and a video parameter set (VPS) or a supplemental enhancement information (SEI) message additionally required for an image decoding process may be generated.

In the NAL, a NAL unit may be generated by adding header information (NAL unit header) to a raw byte sequence payload (RBSP) generated in a VCL. In this case, the RBSP refers to slice data, parameter set, SEI message, etc., generated in the VCL. The NAL unit header may include NAL unit type information specified according to RBSP data included in the corresponding NAL unit.

As shown in FIG. 4, the NAL unit may be classified into a VCL NAL unit and a Non-VCL NAL unit according to the RBSP generated in the VCL. The VCL NAL unit may mean a NAL unit that includes information on the image (slice data) on the image, and the Non-VCL NAL unit may mean a NAL unit that includes information (parameter set or SEI message) required for decoding the image.

The above-described VCL NAL unit and Non-VCL NAL unit may be transmitted through a network by attaching header information according to the data standard of the subsystem. For example, the NAL unit may be transformed into a data format of a predetermined standard such as an H.266/VVC file format, a real-time transport protocol (RTP), a transport stream (TS), etc., and transmitted through various networks.

As described above, the NAL unit may be specified with the NAL unit type according to the RBSP data structure included in the corresponding NAL unit, and information on the NAL unit type may be stored and signaled in the NAL unit header.

For example, the NAL unit may be classified into a VCL NAL unit type and a Non-VCL NAL unit type according to whether the NAL unit includes information (slice data) about an image. The VCL NAL unit type may be classified according to the nature and type of pictures included in the VCL NAL unit, and the Non-VCL NAL unit type may be classified according to types of parameter sets.

The following is an example of the NAL unit type specified according to the type of parameter set included in the Non-VCL NAL unit type.

Adaptation Parameter Set (APS) NAL unit: Type for NAL unit including APS

Decoding Parameter Set (DPS) NAL unit: Type for NAL unit including DPS

Video Parameter Set (VPS) NAL unit: Type for NAL unit including VPS

Sequence Parameter Set (SPS) NAL unit: Type for NAL unit including SPS

Picture Parameter Set (PPS) NAL unit: Type for NAL unit including PPS

Picture header (PH) NAL unit: Type for NAL unit including PH

The aforementioned NAL unit types may have syntax information for the NAL unit type, and the syntax information may be stored and signaled in a NAL unit header. For example, the syntax information may be nal_unit_type, and NAL unit types may be specified by a nal_unit_type value.

Meanwhile, as described above, one picture may include a plurality of slices, and one slice may include a slice header and slice data. In this case, one picture header may be further added to a plurality of slices (a slice header and a slice data set) in one picture. The picture header (picture header syntax) may include information/parameters commonly applicable to the picture. For example, one picture may be configured of different types of slices, such as an intra-coded slice (i.e., I-slice) and/or inter-coded slice (i.e., P-slice and B-slice). In this case, a picture header may include information/parameters being applied to an intra-coded slice and an inter-coded slice. Alternatively, one picture may also be configured of one type of slices.

The slice header (slice header syntax) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may include information/parameters commonly applicable to multiple layers. The DPS (DPS syntax) may include information/parameters commonly applicable to the entire video. The DPS may include information/parameters related to concatenation of a coded video sequence (CVS).

In the present specification (or document), the video/image information that is encoded and signaled in the form of a bitstream from the encoding apparatus to the decoding apparatus may not only include information related to intra-picture partitioning, intra/inter prediction information, information related to inter-layer prediction, residual information, in-loop filtering information, and so on, but may also include information included in the slice header, information included in the picture header, information included in the APS, information included in the PPS, information included in the SPS, information included in the VPS, and/or information included in the DPS. Additionally, the video/image information may further include information of the NAL unit header.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300.

Meanwhile, the above-described encoded image/video information may be configured based on a media file format in order to generate a media file. For example, encoded image/video information may form a media file (segment) based on one or more NAL unit/sample entries for the encoded image/video information. The media file may include a sample entry and a track. For example, the media file (segment) may include various records, and each record may include information related to image/video information or information related to a media file format. Additionally, for example, one or more NAL units may be stored in a configuration record (or decoder configuration record, or VVC decoder configuration record) field of a media file. Herein, the field may also be referred to as a syntax element.

For example, an ISO Base Media File Format (ISOBMFF) may be used as a media file format to which the method/embodiment disclosed in the present disclosure may be applied. The ISOBMFF may be used as the basis of various codec encapsulation formats, such as an AVC file format, an HEVC file format and/or a VVC file format, and so on, and various multimedia container formats, such as an MPEG-4 file format, a 3GPP file format (3GP) and/or a DVB file format, and so on. Additionally, apart from the continuous media, such as audio and video, static media, such as image, and metadata may be stored in a file according to the ISOBMFF. A file that is structured according to the ISOBMFF may be used for various purposes, such as local media file playback, progressive downloading of a remote file, segments for Dynamic Adaptive Streaming over HTTP (DASH), containers and packetization instructions of contents to be streamed, recording of received real-time media streams, and so on.

A 'box' that will hereinafter be described may be an elementary syntax element of the ISOBMFF. An ISOBMFF file may be configured of a sequence of boxes, and another box may be included in a box. For example, a movie box (a box having a grouping type of 'moov') may include metadata for continuous media streams belonging to media file, and each stream may be indicated in the file as a track. Metadata on a track may belong to a track box (a box having a grouping type of 'trak'), and media content of a track may be included in a media data box (a box having a grouping type of 'mdat') or may directly belong to a separate file. Media content of a track may be configured of a sequence of samples, such as audio or video access units. For example, the ISOBMFF may designate various types of tracks, such as media track including elementary media stream, hint track including media transmission instructions or indicating a received packet stream, timed metadata track including timed metadata track.

Additionally, although the ISOBMFF is designed for storage purposes, it is also very useful when performing progressive download or performing streaming, such as DASH. For the purpose of streaming movie fragments that are defined in ISOBMFF may be used. A fragmented ISOBMFF file may, for example, be indicated as two separate files related to video and audio, respectively. For example, when a random access is included after a 'moov' has been received, all movie fragments 'moof' may be decoded together with the related media data.

Additionally, the metadata of each track may include a list of sample description entries, which provides a coding or encapsulation format that is used in the track and initialization data needed for processing the corresponding format. Additionally, each sample may be connected to one of the sample description entries of the track.

When using the ISOBMFF, sample-specific metadata may be designated by various mechanisms. Particular boxes in the sample table box (a box having a grouping type of 'stbl') may be standardized in order to respond to general requirements. For example, a Sync sample box (a box having a grouping type of 'stss') may be used for listing random access samples of a track. By using the sample grouping mechanism, samples may be mapped according to a four-character grouping type to a designated sample group sharing a same property, which is designated to a sample group description entry in the file. Various grouping types may be designated to the ISOBMFF.

Figure 6:
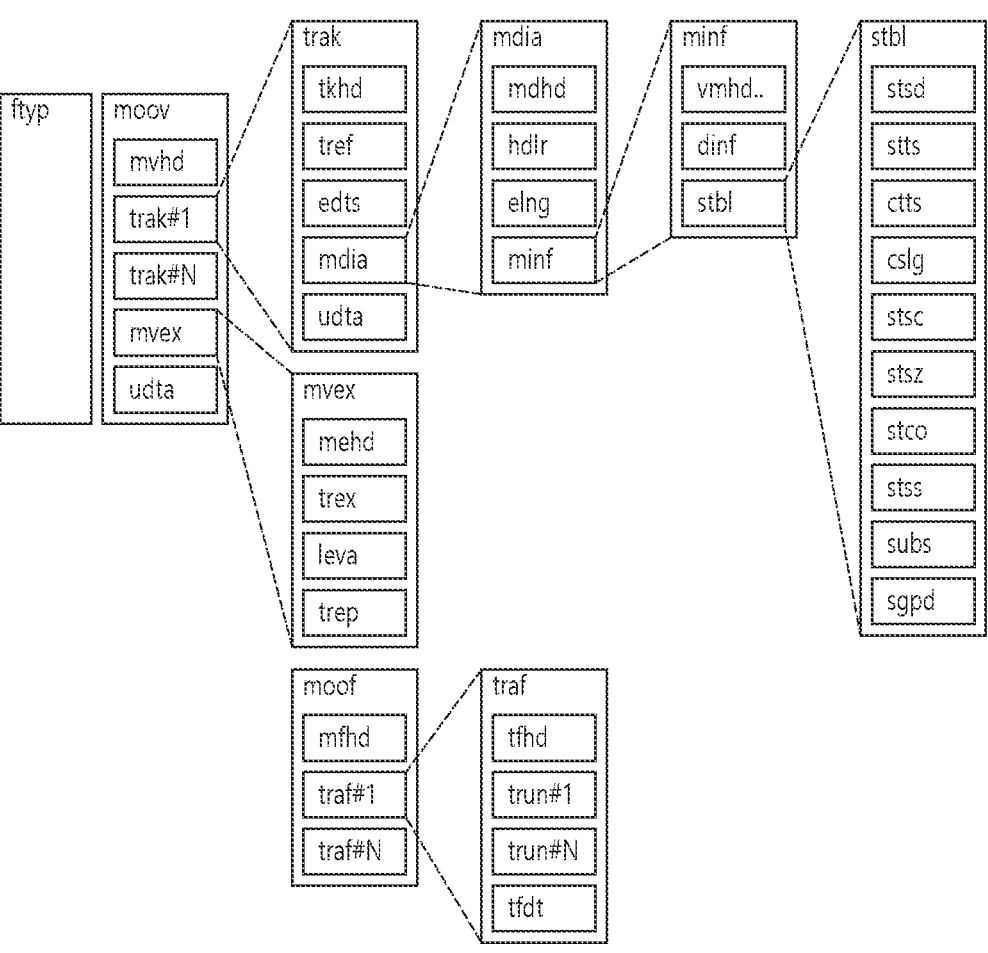

FIGS. 5 and 6 are diagrams illustrating an example of the structure of a media file.

The media file according to an embodiment may include at least one box. Here, a box may be a data block or an object including media data or metadata related to media data. Boxes may be in a hierarchical structure and thus data can be classified and media files can have a format suitable for storage and/or transmission of large-capacity media data. Further, media files may have a structure which allows users to easily access media information such as moving to a specific point of media content.

The media file according to an embodiment may include an ftyp box, a moov box and/or an mdat box.

The ftyp box (file type box) can provide file type or compatibility related information about the corresponding media file. The ftyp box may include configuration version information about media data of the corresponding media file. A decoder can identify the corresponding media file with reference to ftyp box.

The moov box (movie box) may be a box including metadata about media data of the corresponding media file. The moov box may serve as a container for all metadata. The moov box may be a highest layer among boxes related to metadata. According to an embodiment, only one moov box may be present in a media file.

The mdat box (media data box) may be a box containing actual media data of the corresponding media file. Media data may include audio samples and/or video samples. The mdat box may serve as a container containing such media samples.

According to an embodiment, the aforementioned moov box may further include an mvhd box, a trak box and/or an mvex box as lower boxes.

The mvhd box (movie header box) may include information related to media presentation of media data included in the corresponding media file. That is, the mvhd box may include information such as a media generation time, change time, time standard and period of corresponding media presentation.

The trak box (track box) can provide information about a track of corresponding media data. The trak box can include information such as stream related information, presentation related information and access related information about an audio track or a video track. A plurality of trak boxes may be present depending on the number of tracks.

The trak box may further include a tkhd box (track head box) as a lower box. The tkhd box can include information about the track indicated by the trak box. The tkhd box can include information such as a generation time, a change time and a track identifier of the corresponding track.

The mvex box (movie extend box) can indicate that the corresponding media file may have a moof box which will be described later. To recognize all media samples of a specific track, moof boxes may need to be scanned.

The media file may be divided into a plurality of fragments according to an embodiment (200). Accordingly, the media file can be fragmented and stored or transmitted. Media data (mdat box) of the media file can be divided into a plurality of fragments and each fragment can include a moof box and a divided mdat box. According to an embodiment, information of the ftyp box and/or the moov box may be required to use the fragments.

The moof box (movie fragment box) can provide metadata about media data of the corresponding fragment. The moof box may be a highest-layer box among boxes related to metadata of the corresponding fragment.

The mdat box (media data box) can include actual media data as described above. The mdat box can include media samples of media data corresponding to each fragment corresponding thereto.

According to an embodiment, the aforementioned moof box may further include an mfhd box and/or a traf box as lower boxes.

The mfhd box (movie fragment header box) can include information about correlation between divided fragments. The mfhd box can indicate the order of divided media data of the corresponding fragment by including a sequence number. Further, it is possible to check whether there is missed data among divided data using the mfhd box.

The traf box (track fragment box) can include information about the corresponding track fragment. The traf box can provide metadata about a divided track fragment included in the corresponding fragment. The traf box can provide metadata such that media samples in the corresponding track fragment can be decoded/reproduced. A plurality of traf boxes may be present depending on the number of track fragments.

According to an embodiment, the aforementioned traf box may further include a tfhd box and/or a trun box as lower boxes.

The tfhd box (track fragment header box) can include header information of the corresponding track fragment. The tfhd box can provide information such as a basic sample size, a period, an offset and an identifier for media samples of the track fragment indicated by the aforementioned traf box.

The trun box (track fragment run box) can include information related to the corresponding track fragment. The trun box can include information such as a period, a size and a reproduction time for each media sample.

The aforementioned media file and fragments thereof can be processed into segments and transmitted. Segments may include an initialization segment and/or a media segment.

A file of the illustrated embodiment 210 may include information related to media decoder initialization except media data. This file may correspond to the aforementioned initialization segment, for example. The initialization segment can include the aforementioned ftyp box and/or moov box.

A file of the illustrated embodiment 220 may include the aforementioned fragment. This file may correspond to the aforementioned media segment, for example. The media segment may further include an styp box and/or an sidx box.

The styp box (segment type box) can provide information for identifying media data of a divided fragment. The styp box can serve as the aforementioned ftyp box for a divided fragment. According to an embodiment, the styp box may have the same format as the ftyp box.

The sidx box (segment index box) can provide information indicating an index of a divided fragment. Accordingly, the order of the divided fragment can be indicated.

A ssix box may be further included according to an embodiment 230. The ssix box (sub-segment index box) can provide information indicating an index of a sub-segment when a segment is divided into sub-segments.

Boxes in a media file, for example, can include more extended information based on a box or a FullBox as shown in the illustrated embodiment 250. In the present embodiment, a size field and a largesize field can represent the length of the corresponding box in bytes. A version field can indicate the version of the corresponding box format. A type field can indicate the type or identifier of the corresponding box. A flags field can indicate a flag associated with the corresponding box.

Meanwhile, the fields (properties) of the video/image of the present document may be transferred by being included in the DASH-based adaptive streaming model.

Figure 7:
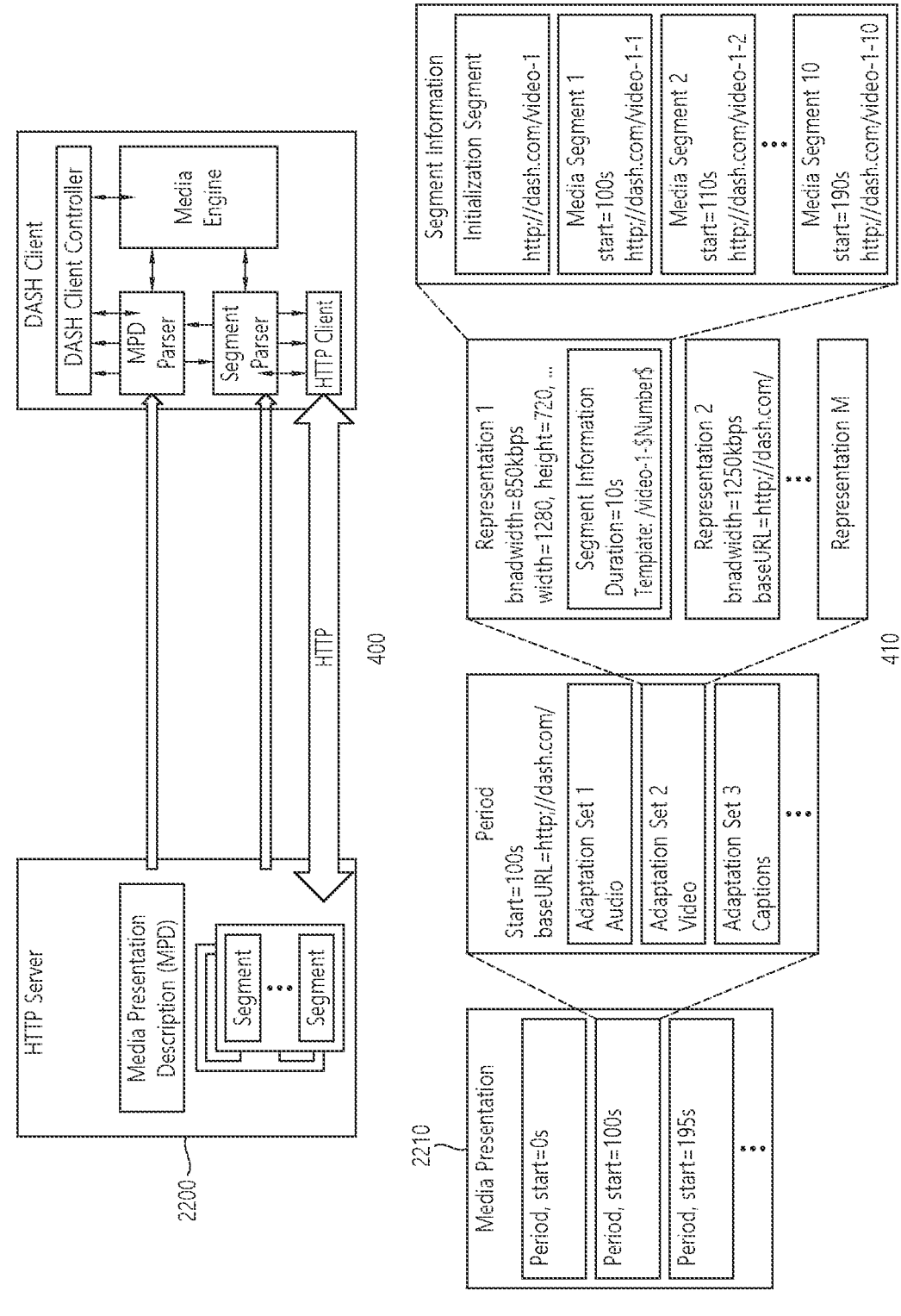
FIG. 7 shows an example of the overall operation of the DASH-based adaptive streaming model.

FIG. 7 is a diagram illustrating the overall operation of a DASH-based adaptive streaming model according to an embodiment of the present disclosure. A DASH-based adaptive streaming model according to the embodiment shown in (400) describes the operation between an HTTP server and a DASH client. Here, Dynamic Adaptive Streaming over HTTP (DASH), which is a protocol for supporting HTTP-based adaptive streaming, may dynamically support streaming depending on network conditions. As a result, AV content may be reproduced without interruption.

First, the DASH client may acquire MPD. The MPD may be delivered from a service provider such as an HTTP server. The DASH client may request a segment described in the MPD from the server using information about access to the segment. Here, this request may be performed in consideration of network conditions.

After acquiring the segment, the DASH client may process the segment using a media engine, and may display the segment on a screen. The DASH client may request and acquire a necessary segment in real-time consideration of reproduction time and/or network conditions (Adaptive Streaming). As a result, content may be reproduced without interruption.

Media Presentation Description (MPD) is a file including detailed information enabling the DASH client to dynamically acquire a segment, and may be expressed in the form of XML.

A DASH client controller may generate a command for requesting MPD and/or a segment inconsideration of network conditions. In addition, this controller may perform control such that the acquired information can be used in an internal block such as the media engine.

An MPD parser may parse the acquired MPD in real time. In doing so, the DASH client controller may generate a command for acquiring a necessary segment.

A segment parser may parse the acquired segment in real time. The internal block such as the media engine may perform a specific operation depending on information included in the segment.

An HTTP client may request necessary MPD and/or a necessary segment from the HTTP server. In addition, the HTTP client may deliver the MPD and/or segment acquired from the server to the MPD parser or the segment parser.

The media engine may display content using media data included in the segment. In this case, information of the MPD may be used.

A DASH data model may have a hierarchical structure (410). Media presentation may be described by the MPD. The MPD may describe the temporal sequence of a plurality of periods making media presentation. One period may indicate one section of the media content.

In one period, data may be included in adaptation sets. An adaptation set may be a set of media content components that can be exchanged with each other. Adaptation may include a set of representations. One representation may correspond to a media content component. In one representation, content may be temporally divided into a plurality of segments. This may be for appropriate access and delivery. A URL of each segment may be provided in order to access each segment.

The MPD may provide information related to media presentation. A period element, an adaptation set element, and a representation element may describe a corresponding period, adaptation set, and representation, respectively. One representation may be divided into sub-representations. A sub-representation element may describe a corresponding sub-representation.

Here, common attributes/elements may be defined. The common attributes/elements may be applied to (included in) the adaptation set, the representation, and the sub-representation. EssentialProperty and/or SupplementalProperty may be included in the common attributes/elements.

EssentialProperty may be information including elements considered to be essential to process data related to the media presentation. SupplementalProperty may be information including elements that may be used to process data related to the media presentation. In some embodiments, in the case where signaling information, a description of which will follow, is delivered through the MPD, the signaling information may be delivered while being defined in EssentialProperty and/or SupplementalProperty.

Meanwhile, the above-described encoded image/video information may be configured based on a media file format in order to generate a media file. For example, the encoded image/video information may form a media file (segment) based on one or more NAL unit/sample entries on the encoded image/video information. The media field may include a sample entry and a track. For example, a media file (segment) may include various records, and each record may include information related to image/video or information related to a media file format. Additionally, for example, one or more NAL units may be stored in a configuration record (or decoder configuration record or VVC decoder configuration record) field of a media file. Herein, a field may also be referred to as a syntax element.

Meanwhile, a 'sample' that will hereinafter be described may be a single time of one of 3 sample arrays (Y, Cb, Cr) representing a picture or all data related to a single element. For example, when the term 'sample' is used in the context of a track (of a media file format), a 'sample' may mean all data related to a single time of the corresponding track. Herein, a time may be a decoding time or a composition time. Additionally, for example, when the term 'sample' is used in the context of a picture, i.e., when the term is used in a phrase such as "luma sample", then, a sample may indicate a single element belonging to one of the 3 sample arrays representing a picture.

Meanwhile, the following three types of elementary streams may be defined in order to store VVC content:

Video elementary stream which includes VCL NAL units and does not include any parameter sets, DCI, or OPI NAL units. Here, all parameter sets, DCI, and OPI NAL units are stored in one or more sample entries. A video elementary stream may include non-VCL NAL units which are not parameter sets, not DCI NAL units, and not OPI NAL units.

Video and parameter set elementary stream that includes VCL NAL units and may include parameter sets, DCI, or OPI NAL units, and may also have parameter sets, DCI, or OPI NAL units stored in one or more sample entries.

Non-VCL elementary stream that includes non-VCL NAL units only. The non-VCL NAL units are synchronized with the elementary stream carried in the video track. Here, A VVC non-VCL track does not include parameter set, DCI, or OPI NAL units in its sample entries.

Meanwhile, a VVC video stream may be defined as follows.

Sample entry types may include 'vvc1', 'vvi1', and 'vvs1'. Box types may include 'vvcC' and 'vvnC'. A container may be a Sample Table Box ('stbl'). In addition, 'vvc1' or 'vvi1' sample entry is mandatory in at least one track among the tracks carrying a VVC bitstream. One or more sample entries may be present.

A VVC sample entry is defined to be a sample entry that has sample entry type equal to 'vvc1' or 'vvi1'. Each sample entry of a VVC track shall be a VVC sample entry. A VVC sample entry shall include a VVC Configuration Box, as defined below. This includes a VvcDecoderConfigurationRecord, as defined in 11.3.3.1.

An optional BitRateBox may be present in a VVC sample entry to signal the bit rate information of the VVC video stream. Extension descriptors which should be inserted into the Elementary Stream Descriptor, when used in MPEG-4, may also be present.

Multiple sample entries may be used, as permitted by the ISO Base Media File Format specification, to indicate sections of video which use different configurations or parameter sets.

If a VVC subpicture track includes a conforming VVC bitstream, which can be consumed without other VVC subpicture tracks, a regular VVC sample entry is used ('vvc1' or 'vvi1') for the VVC subpicture track.

Otherwise, the 'vvs1' sample entry may be used for the VVC subpicture track, and the following constraints may apply for the track:

The track_in_movie flag shall be equal to 0.

The track shall contain one and only one sample entry.

The track shall be referenced by at least one VVC base track through the 'subp' track reference.

DCI, OPI, VPS, SPS, PPS, AUD, PH, EOS, EOB and other AU- or picture-level non-VCL NAL units shall be absent both in the sample entry and in the samples of 'vvs1' tracks.

Unless indicated otherwise, child boxes of video sample entries (such as CleanApertureBox and PixelAspectRatioBox) should not be present in the sample entry and, if present, shall be ignored.

A sample shall not be marked as a sync sample unless all the VCL NAL units it includes conform to the sync sample requirements.

The composition time offset information for samples of a 'vvs1' track shall not be present.

Subsample information for samples of a 'vvs1' track may be present. If present, the subsample information shall follow the definition of sub-samples for VVC.

A VVC track may include a 'subp' track reference, with entries including either a value of track_ID of a VVC subpicture track or a value of track_group_id of an 'alte' track group of VVC subpicture tracks.

A sample group of type 'spor', as specified in clause 11.7.7, shall be present in each VVC base track.

The sample entry of type 'vvs1' shall include VvcNALUConfigBox.

When the VVC subpicture track is referenced by a VVC base track including a 'spor' sample group description entry having subpic_id_info_flag equal to 1, the VVC subpicture track shall include a subpicture ID sample group description, potentially using the default sample grouping mechanism.

When the sample entry name is 'vvc1' or 'vvi1', the stream to which this sample entry applies shall be a compliant VVC stream as viewed by a VVC decoder operating under the configuration (including profile, tier, and level) given in the VVCConfigurationBox.

When the sample entry name is 'vvc1', the value of array_completeness shall be equal to 1 for arrays of DCI, VPS, SPS, and PPS NAL units, and 0 for all other arrays. When the sample entry name is 'vvi1', the value of array_ completeness shall be equal to 0 for all arrays.

When the track does not natively include a VVC bitstream and does not represent a VVC bitstream after resolving 'subp' and 'vvcN' track references (w % ben present), the track shall include an 'oref' track reference either to a track that carries the 'vopi' sample group or to an Operating Points Entity Group.

For example, when a single-layer VVC bitstream includes two temporal sublayers stored indifferent tracks, the track that includes the sublayer with TemporalId equal to 1 includes an 'oref' track reference to the track that contains the sublayer with TemporalId equal to 0.

Meanwhile, operating points information of an ISO based media file format (ISOBMFF) for VVC may be signaled to a sample from a group box having a grouping type of 'vopi' or an entity group having a group type of 'opeg'. Herein, an operating point may be a temporal subset of an Output Layer Set (OLS) that is identified by an OLS index and a highest TemporalId value. Each operating point may be related to a profile, a tier, and a level (i.e., PTL) defining conformance point of each operating point. The operating points infor- mation may be needed for identifying a sample and a sample entry from each operating point.

Applications may be provided with information on the constitution of operating points by using various operating points provided from a given VVC bitstream and an oper- ating points information sample group 'vopi'. Each operat- ing point may be related to an OLS, a highest TemporalId value, and profile, level, and tier signaling. All of the above-described information may be captured by a 'vopi' sample group. Apart from the above-described information, the sample group may also provide dependency information among layers.

Meanwhile, when one or more VVC tracks exist for a VVC bitstream and an Operating Points entity group does not exist for the VVC bitstream, all of the following details may be applied:

among VVC tracks for the VVC bitstream, there should be only one track delivering the 'vopi' sample group.
  all other VVC tracks of the VVC bitstream should have an 'oref' type track reference for the track delivering the 'vopi' sample.

Additionally, for a particular sample of a given track, a temporally collocated sample of another track may be defined as a sample having the same decoding time as the particular sample. For each sample SN of a track TN having an 'oref' track reference for a track Tk, which delivers the 'vopi' sample group, the following may be applied:

when a temporal collocated sample Sk exists in a track Tk, a sample SN may be related to the same 'vopi' sample group entity as sample Sk.
  otherwise, a sample SN may be related to a same 'vopi' sample group entity as sample Sk.

When several VPSs are referenced in a VVC bitstream, several entities may have to be included in a sample group description box to which the grouping_type 'vopi' belongs. In a more general case where a single VPS exists, it may be recommended to include an operating points information sample group in a sample table box, without including it in each track fragment, by using a default sample group mechanism, which is defined in ISO/IEC 14496-12.

Additionally, a grouping_type_parameter may not be defined for a SampleToGroupBox having a grouping type of 'vopi'.

The syntax of the 'vopi' sample group including the above-described operating points information, i.e., the oper- ating points information sample group, may be as shown below in the following table.

TABLE 1

```
class VvcOperatingPointsRecord {
    unsigned int(8) num_profile_tier_level_minus1;
    for (i=0; i<=num_profile_tier_level_minus1; i++) {
        unsigned int(8) ptl_max_temporal_id[i];
        VvcPTLRecord(ptl_max_temporal_id[i]+1) ptl[i];
    }
    unsigned int(1) all_independent_layers_flag;
    bit(7) reserved = 0;
    if (all_independent_layers_flag) {
        unsigned int(1) each_layer_is_an_ols_flag;
        bit(7) reserved = 0;
    } else
        unsigned int(8) ols_mode_idc;
    bit(7) reserved = 0;
    unsigned int(9) num_olss;
    for (i=0; i<num_olss; i++) {
        unsigned int(8) ptl_idx[i];
        unsigned int(9) output_layer_set_idx[i];
        unsigned int(6) layer_count[i];
        bit(1) reserved = 0;
        for (j=0; j<layer_count; j++) {
            unsigned int(6) layer_id[i] [j];
            unsigned int(1) is_output_layer[i] [j];
            bit(1) reserved = 0;
        }
    }
    bit(4) reserved = 0;
    unsigned int(12) num_operating_points;
    for (i=0; i<num_operating_points; i++) {
        unsigned int(9) ols_idx;
        unsigned int(3) max_temporal_id;
        unsigned int(1) frame_rate_info_flag
        unsigned int(1) bit_rate_info_flag
        bit(5) reserved = 0;
        unsigned int(2) chroma_format_idc;
        unsigned int(3) bit_depth_minus8;
        unsigned_int(16) picture_width;
        unsigned_int(16) picture_height;
        if (frame_rate_info_flag) {
            unsigned int(16) avgFrameRate;
            bit(6) reserved = 0;
            unsigned int(2) constantFrameRate;
        }
        if (bit_rate_info_flag) {
            unsigned int(32) maxBitRate;
            unsigned int(32) avgBitRate;
        }
    }
    unsigned int(8) max_layer_count;
    for (i=0; i<max_layer_count; i++) {
        unsigned int(8) layerID;
        unsigned int(8) num_direct_ref_layers;
        for (j=0; j<num_direct_ref_layers; j++) {
            unsigned int(8) direct_ref_layerID;
            unsigned int(8) max_tid_il_ref_pics_plus1;
        }
    }
}
class VvcOperatingPointsInformation extends VisualSampleGroupEntry
('vopi') {
    VvcOperatingPointsRecord oinf;
}
```

For example, referring to Table 1, a 'vopi' sample group may include information related to a list of operating points. The information related to the list of the operating points includes, for example, number of operating points information, OLS index information, maximum temporal ID information, frame rate information flag, frame rate information, bit rate information flag, bit rate information, chroma format idc information, bit depth information, picture width information, picture height information, entity count information, and entity index information.

The number of operating point information may be represented by, for example, a syntax element op_in_sample_entry_included_flag. The OLS index information may be represented by, for example, a syntax element ols_idx. The maximum temporal ID information may be represented by, for example, a syntax element max_temporal_id. The frame rate information flag may be represented by, for example, a syntax element frame_rate_info_flag. The frame rate information may include, for example, syntax elements avgFrameRate and constantFrameRate. The bit rate information flag may be represented by, for example, a syntax element bit_rate_info_flag. The bit rate information may include, for example, syntax elements maxBitRate and avgBitRate. The chroma format idc information may be represented by, for example, a syntax element chroma_format_idc. The bit depth information may be represented by, for example, a syntax element bit_depth_minus8. The picture width information may be represented by, for example, a syntax element picture_width. The picture height information may be represented by, for example, a syntax element picture_height. The entity count information may be represented by, for example, a syntax element entity_count. The entity index information may be represented by, for example, a syntax element entity_idx.

In addition, the semantics of the syntax of the operating point information sample group, that is, the 'vopi' sample group, may be as shown in the following table.

TABLE 2 num_profile_tier_level_minus1 plus 1 gives the number of the subsequent profiles,
  tier, and level combinations as well as the associated fields.
ptl_max_temporal_id[i]: Gives the maximum TemporalID of NAL units of the
  associated bitstream for the specified i-th profile, tier, and level structure.
      NOTE 1: The semantics of ptl_max_temporal_id[i] and max_temporal_id of an
      operating point, given below, are different even though they may carry the same numerical value.
ptl[i] specifies the i-th profile, tier, and level structure.
all_independent_layers_flag, each_layer_is_an_ols_flag,
  ols_mode_idc and max_tid_il_ref_pics_plus1 are defined in ISO/IEC 23090-3.
num_olss specifies the number of output layer sets signalled in this syntax structure. The value of
  num_olss shall be less than or equal to the value of TotalNumOlss as specified in ISO/IEC
  23090-3.
ptl_idx[i] specifies the zero-based index of the listed profile, tier, and level structure for the i-
  th output layer set signalled in this syntax structure.
output_layer_set_idx[i] is the output layer set index of the i-th output layer set signalled
  in this syntax structure.
layer_count[i] specifies the number of layers in the i-th output layer set signalled in this
  syntax structure.
layer_id[i] [j] specifies the nuh_layer_id value for the j-th layer in the i-th output layer set
  signalled in this syntax structure.
is_output_layer[i] [j] equal to 1 specifies that the j-th layer is an output layer in the i-th
  output layer set signalled in this syntax structure. is_output_layer[i][j] equal to 0 specifies that the
  j-th layer in not an output layer in the i-th output layer set signalled in this syntax structure.
num_operating_points: Gives the number of operating points for which the
  information follows.
ols_idx is the index to the list of output layer sets signalled in this syntax structure for the
  operating point.
max_temporal_id indicates the maximum TemporalId of NAL units of this operating
  point.
frame_rate_info_flag equal to 0 indicates that no frame rate information is present
  for the operating point. The value 1 indicates that frame rate information is present for the
  operating point.
bit_rate_info_flag equal to 0 indicates that no bitrate information is present for the
  operating point. The value 1 indicates that bitrate information is present for the operating
  point.
chroma_format_idc indicates the chroma format that applies to this operating point. The
  following constraints apply for chroma_format_idc:
    - If this operating point contains only one layer, the value of sps_chroma_format_idc, as
      defined in ISO/IEC 23090-3, shall be the same in all SPSs referenced by the VCL NAL units
      in the VVC bitstream of this operating point, and the value of chroma_format_idc
      shall be equal to that value of sps_chroma_format_idc.
    - Otherwise (this operating point contains more than one layer), the value of
      chroma_format_idc shall be equal to the value of
      vps_ols_dpb_chroma_format[ MultiLayerOlsidx[ output_layer_set_id ] ], as
      defined in ISO/IEC 23090-3.
bit_depth_minus8 indicates the bit depth that applies to this operating point. The following
  constraints apply for bit_depth_minus8:
    - If this operating point contains only one layer, the value of sps_bitdepth_minus8, as
      defined in ISO/IEC 23090-3, shall be the same in all SPSs referenced by the VCL NAL units
      in the VVC bitstream of this operating point, and the value of bit_depth_minus8 shall
      be equal to that value of sps_bitdepth_minus8.
    - Otherwise(this operating point contains more than one layer), the value of
      bit_depth_minus8 shall be equal to the value of
      vps_ols_dpb_bitdepth_minus8[ MultiLayerOlsidx[ output_layer_set_ids ] ], as
      defined in ISO/IEC 23090-3.

TABLE 2-continued picture_width indicates the maximum picture width, in units of luma samples, that applies to
   this operating point. The following constraints apply for picture_width:
     -   If this operating point contains only one layer, the value of
        sps_pic_width_max_in_luma_samples, as defined in ISO/IEC 23090-3, shall be the same
        in all SPSs referenced by the VCL NAL units in the VVC bitstream of this operating point,
        and the value of picture_width shall be equal to that value of
        sps_pic_width_max_in_luma_samples.
     -   Otherwise (this operating point contains more than one layer), the value of
        picture_width shall be equal to the value of
        vps_ols_dpb_pic_width[ MultiLayerOlsidx[ output_layer_set_idx ] ], as defined in
        ISO/IEC 23090-3.
picture_height indicates the maximum picture height, in units of luma samples, that applies to
   this operating point. The following constraints apply for picture_height:
     -   If this operating point contains only one layer, the value of
        sps_pic_height_max_in_luma_samples, as defined in ISO/IEC 23090-3, shall be the same
        in all SPSs referenced by the VCL NAL units in the VVC bitstream of this operating point,
        and the value of picture_height shall be equal to that value of
        sps_pic_height_max_in_luma_samples.
     -   Otherwise (this operating point contains more than one layer), the value of
        picture_height shall be equal to the value of
        vps_ols_dpb_pic_height[ MultiLayerOlsidx[ output_layer_set_idx ] ], as defined
        in ISO/IEC 23090-3.
avgFrameRate gives the average frame rate in units of frames/(256 seconds) for the
   operating point. Value 0 indicates an unspecified average frame rate. When the bitstream
   of the operating point contains multiple layers, this gives the average access unit rate.
constantFrameRate equal to 1 indicates that the stream of the operating point is of
   constant frame rate. Value 2 indicates that the representation of each temporal layer in the
   stream of the operating point is of constant frame rate. Value 0 indicates that the stream of
   the operating point may or may not be of constant frame rate. When the bitstream of the
   operating point contains multiple layers, this gives the indication of whether the bitstream
   of the operating point has constant access unit rate.
maxBitRate gives the maximum bit rate in bits/second of the stream of the operating point,
   over any window of one second.
avgBitRate gives the average bit rate in bits/second of the stream of the operating point.
max_layer_count specifies the count of all unique layers in all of the operating points
   described in the sample group entry.
layerID specifies nuh_layer_id of a layer for which all the direct reference layers are given
   in the following loop of direct_ref_layerID.
num_direct_ref_layers specifies the number of direct reference layers for the layer
   with nuh_layer_id equal to layerID.
direct_ref_layerID indicates nuh_layer_id of the direct reference layer.
max_tid_il_ref_pics_plus1 equal to 0 specifies that the pictures of the layer with
   nuh_layer_id equal to direct_ref_layerID that are neither IRAP pictures nor GDR
   pictures with ph_recovery_poc_cnt equal to 0 are not used as inter-layer reference pictures
   for decoding of pictures of the layer with nuh_layer_id equal to layerID. A value greater
   than 0 specifies that, for decoding pictures of the layer with nuh_layer_id equal to
   layerID, no picture from the layer with nuh_layer_id equal to
   direct_ref_layerID with TemporalId greater than
   max_tid_il_ref_pics_plus1 − 1 is used as an inter-layer reference picture and no
   APS with nuh_layer_id equal to direct_ref_layerID and TemporalId greater than
   max_tid_il_ref_pics_plus1 − 1 is referenced.

Additionally, for example, the operating points entity group may be defined to be able to provide track mapping of the operating points and profile level information of the operating points.

When aggregating samples of a track being mapped to the operating point that is described above in the operating points entity group, an implicit reconstruction process no longer needs to remove any more NAL units in order to obtain a conforming VVC bitstream. A track belonging to the operating points entity group should have a track reference of the 'oref' type for a group_id that is indicated in the operating points entity group, and should not carry the 'vopi' sample group.

Additionally, all entity_id values included in the operating points entity group should represent track IDs of tracks belonging to the same VVC bitstream. If present (or existing), an OperatingPointGroupBox is included in a GroupsListBox of a file-level MetaBox and is not included in a MetaBoxes of other levels. Herein, the OperatingPointGroupBox may represent the operating points entity group.

A syntax of the above-described operating points entity group may be as shown below is the following table.

TABLE 3

```
aligned(8) class OperatingPointGroupBox extends
EntityToGroupBox('opeq',0,0)
{
    unsigned int(8) num_profile_tier_level_minus1;
    for (i=0; i<=num_profile_tier_level_minus1; i++)
        VvcPTLRecord(0) opeg_ptl[i];
    bit(7) reserved = 0;
    unsigned int(9) num_olss;
    for (i=0; i<num_olss; i++) {
        unsigned int(8) ptl_idx[i];
        unsigned int(9) output_layer_set_idx[i];
        unsigned int(6) layer_count[i];
        bit(1) reserved = 0;
        for (j=0; j<layer_count; j++) {
            unsigned int(6) layer_id[i] [j];
            unsigned int(1) is_output_layer[i] [j];
            bit(1) reserved = 0;
        }
    }
    bit(4) reserved = 0;
    unsigned int(12) num_operating_points;
```

TABLE 3-continued

```
for (i=0; i<num_operating_points; i++) {
    unsigned int(9) ols_idx;
    unsigned int(3) max_temporal_id;
    unsigned int(1) frame_rate_info_flag
    unsigned int(1) bit_rate_info_flag
    bit(5) reserved = 0;
    unsigned int(2) chroma_format_idc;
    unsigned int(3) bit_depth_minus8;
    unsigned_int(16) picture_width;
    unsigned_int(16) picture_height;
    if (frame_rate_info_flag) {
        unsigned int(16) avgFrameRate;
        bit(6) reserved = 0;
        unsigned int(2) constantFrameRate;
    }
    if (bit_rate_info_flag) {
        unsigned int(32) maxBitRate;
        unsigned int(32) avgBitRate;
    }
    unsigned int(8) entity_count;
    for (j=0; j<entity_count; j++) {
        unsigned int(8) entity_idx;
    }
  }
}
```

For example, referring to Table 3 above, the operating point entity group may include information related to a list of an operating points. The information related to the list of the operating points may include, for example, number of operating points information, OLS index information, maximum temporal ID information, frame rate information flag, frame rate information, bit rate information flag, bit rate information, chroma format idc information, bit depth information, picture width information, picture height information, entity count information, and entity index information.

The number of operating points information may be represented by, for example, a syntax element op_in_sample_entry_included_flag. The OLS index information may be represented by, for example, a syntax element ols_idx. The maximum temporal ID information may be represented by, for example, a syntax element max_temporal_id. The frame rate information flag may be represented by, for example, a syntax element frame_rate_info_flag. The frame rate information may include, for example, syntax elements avgFrameRate and constantFrameRate. The bit rate information flag may be represented by, for example, a syntax element bit_rate_info_flag. The bit rate information may include, for example, syntax elements maxBitRate and avgBitRate. The chroma format idc information may be represented by, for example, a syntax element chroma_format_idc. The bit depth information may be represented by, for example, a syntax element bit_depth_minus8. The picture width information may be represented by, for example, a syntax element picture_width. The picture height information may be represented by, for example, a syntax element picture_height. The entity count information may be represented by, for example, a syntax element entity_count. The entity index information may be represented by, for example, a syntax element entity_idx.

In addition, semantics of the syntax of the operating point entity group may be as shown in the following table.

TABLE 4 num_profile_tier_level_minus1 plus 1 gives the number of following profiles, tier,
    and level combinations as well as the associated fields.
opeg_ptl[i] specifies the i-th profile, tier, and level structure.
num_olss specifies the number of output layer sets signalled in this syntax structure. The value of
    num_olss shall be less than or equal to the value of TotalNumOlss as specified in ISO/IEC
    23090-3.
ptl_idx[i] specifies the zero-based index of the listed profile, tier, and level structure for the i-
    th output layer set signalled in this syntax structure.
output_layer_set_idx[i] is the output layer set index of the i-th output layer set signalled
    in this syntax structure.
layer_count [i] specifies the number of layers in the i-th output layer set signalled in this
    syntax structure.
layer_id[i] [j] specifies the nuh_layer_id value for the j-th layer in the i-th output layer set
    signalled in this syntax structure.
is_output_layer[i] [j] equal to 1 specifies that the j-th layer is an output layer in the i-th
    output layer set signalled in this syntax structure. is_output_layer[i][j] equal to 0 specifies that the
    j-th layer in not an output layer in the i-th output layer set signalled in this syntax structure.
num_operating_points: Gives the number of operating points for which the
    information follows.
ols_idx is the index to the list of output layer sets signalled in this syntax structure for the
    operating point.
max_temporal_id: Gives the maximum TemporalId of NAL units of this operating point.
frame_rate_info_flag equal to 0 indicates that no frame rate information is present
    for the operating point. The value 1 indicates that frame rate information is present for the
    operating point.
bit_rate_info_flag equal to 0 indicates that no bitrate information is present for
    the operating point. The value 1 indicates that bitrate information is present for the
    operating point.
chroma_format_idc indicates the chroma format that applies to this operating point. The
    following constraints apply for chroma_format_idc:
        - If this operating point contains only one layer, the value of sps_chroma_format_idc, as
          defined in ISO/IEC 23090-3, shall be the same in all SPSs referenced by the VCL NAL units
          in the VVC bitstream of this operating point, and the value of chroma_format_idc
          shall be equal to that value of sps_chroma_format_idc.
        - Otherwise (this operating point contains more than one layer), the value of
          chroma_format_idc shall be equal to the value of
          vps_ols_dpb_chroma_format[ MultiLayerOlsidx[ output_layer_set_idx ] ], as
          defined in ISO/IEC 23090-3.

TABLE 4-continued bit_depth_minus8 indicates the bit depth that applies to this operating point. The following
    constraints apply for bit_depth_minus8:
    - If this operating point contains only one layer, the value of sps_bitdepth_minus8, as
      defined in ISO/IEC 23090-3, shall be the same in all SPSs referenced by the VCL NAL units
      in the VVC bitstream of this operating point, and the value of bit_depth_minus8 shall
      be equal to that value of sps_bitdepth_minus8.
    - Otherwise(this operating point contains more than one layer), the value of
      bit_depth_minus8 shall be equal to the value of
      vps_ols_dpb_bitdepth_minus8[ MultiLayerOlsidx[ output_layer_set_idx ] ], as
      defined in ISO/IEC 23090-3.
picture_width indicates the maximum picture width, in units of luma samples, that applies to
    this operating point. The following constraints apply for picture_width:
    - If this operating point contains only one layer, the value of
      sps_pic_width_max_in_luma_samples, as defined in ISO/IEC 23090-3, shall be the same
      in all SPSs referenced by the VCL NAL units in the VVC bitstream of this operating point,
      and the value of picture_width shall be equal to that value of
      sps_pic_width_max_in_luma_samples.
    - Otherwise (this operating point contains more than one layer), the value of
      picture_width shall be equal to the value of
      vps_ols_dpb_pic_width[ MultiLayerOlsidx[ output_layer_set_idx ] ], as defined in
      ISO/IEC 23090-3.
picture_height indicates the maximum picture height, in units of luma samples, that applies to
    this operating point. The following constraints apply for picture_height:
    - If this operating point contains only one layer, the value of
      sps_pic_height_max_in_luma_samples, as defined in ISO/IEC 23090-3, shall be the same
      in all SPSs referenced by the VCL NAL units in the VVC bitstream of this operating point,
      and the value of picture_height shall be equal to that value of
      sps_pic_height_max_in_luma_samples.
    - Otherwise (this operating point contains more than one layer), the value of
      picture_height shall be equal to the value of
      vps_ols_dpb_pic_height[ MultiLayerOlsidx[ output_layer_set_idx ] ], as defined
      in ISO/IEC 23090-3.
avgFrameRate gives the average frame rate in units of frames/(256 seconds) for the
    operating point. Value 0 indicates an unspecified average frame rate.
constantFrameRate equal to 1 indicates that the stream of the operating point is of
    constant frame rate. Value 2 indicates that the representation of each temporal layer in the
    stream of the operating point is of constant frame rate. Value 0 indicates that the stream of
    the operating point may or may not be of constant frame rate.
maxBitRate gives the maximum bit rate in bits/second of the stream of the operating point,
    over any window of one second.
avgBitRate gives the average bit rate in bits/second of the stream of the operating point.
entity_count specifies the number of tracks that are present in an operating point.
entity_idx specifies the index to the entity_id list in the entity group that belongs to
    an operating point.

Additionally, or example, a media tile may include decoder configuration information for an image/video content. That is, a media file may include VVC decoder configuration record including decoder configuration information.

When the VVC decoder configuration record is stored in a sample entry, the VVC decoder configuration record may include not only a parameter set, DCI, OPI and SEI NAL unit, but also a size of a length field that is used for each sample in order to indicate a length of a NAL unit included in the VVC decoder configuration record. The VVC decoder configuration record may be formed (or configured) configured from an external source (frame) (herein, a size of the VVC decoder configuration record is provided from a structure including the VVC decoder configuration record).

Additionally, the VVC decoder configuration record may include a version field. For example, a version in the present disclosure may define Version 1 of the VVC decoder configuration record. Changes that are not compatible with the VVC decoder configuration record may be indicated as a change in the version number. In the version number is not recognized, readers should not decode the VVC decoder configuration record or a stream to which the corresponding record applies.

Compatible extensions for the VVC decoder configuration record may not change the configuration version code. Readers should be prepared to ignore (or disregard) unrecognized data exceed the data definition understood by the readers.

When the track includes a VVC bitstream natively or though resolving 'subp' track references, VvcPtlRecord should be present in the decoder configuration record, and in this case the specific output layer set for the VVC bitstream is indicated by the field output_layer_set_idx. If the ptl_present_flag is equal to 0 in the decoder configuration record of a track, the track should have an 'oref' track reference to an ID, which may refer to either a VVC track or an 'opeg' entity group.

The values for the syntax elements of VvcPTLRecord, chroma_format_idc, and bit_depth_minus8 may be valid for all parameter sets that are referenced when the stream described by the VVC decoder configuration record is decoded. Specifically, the following restrictions may apply:

The profile indication general_profile_idc shall represent a profile to which the output layer set identified by output_layer_set_idx in this configuration record conforms.

The tier indication general_tier_flag shall represent a tier equal to or greater than the highest tier indicated in all the profile_tier_level( ) syntax structures (in all the parameter sets) to which the output layer set identified by output_layer_set_idx in this configuration record conforms.

Each bit in general_constraint_info may only be set if the bit is set in all the general_constraints_info( ) syntax structures in all the profile tier level( ) syntax structures (in all the parameter sets) to which the output layer set identified by output_layer_set_idx in this configuration record conforms.

The level indication general_level_idc shall indicate a level of capability equal to or greater than the highest level in all the profile_tier_level( ) syntax structures (in all the parameter sets) to which the output layer set identified by output_layer_set_idx in this configuration record conforms.

The following constraints may apply for chroma_format_idc:

If the VVC stream to which the configuration record applies is a single-layer bitstream, the value of sps_chroma_format_idc, as defined in ISO/IEC 23090-3, shall be the same in all SPSs referenced by the VCL NAL units in the samples to which the current sample entry description applies, and the value of chroma_format_idc shall be equal to the value of sps_chroma_format_idc.

Otherwise (i.e. if the VVC stream to which the configuration record applies is a multi-layer bitstream), the value of vps_ols_dpb_chroma_format[MultiLayerOlsIdx[output_layer_set_idx]], as defined in ISO/IEC 23090-3, shall be the same for all the CVSs to which the current sample entry description applies, and the value of chroma_format_idc shall be equal to the value of vps_ols_dpb_chroma_format[MultiLayerOlsIdx[output_layer_set_idx]].

The following constraints may apply for bit_depth_minus8:

If the VVC stream to which the configuration record applies is a single-layer bitstream, the value of sps_bitdepth_minus8, as defined in ISO/IEC 23090-3, shall be the same in all SPSs referenced by the VCL NAL units in the samples to which the current sample entry description applies, and the value of bit_depth_minus8 shall be equal to the value of sps_bitdepth_minus8.

Otherwise (i.e. if the VVC stream to which the configuration record applies is a multi-layer bitstream), the value of vps_ols_dpb_bitdepth_minus8[MultiLayerOlsIdx[output_layer_set_idx]], as defined in ISO/IEC 23090-3, shall be the same for all the CVSs to which the current sample entry description applies, and the value of bit_depth_minus8 shall be equal to the value of vps_ols_dpb_bitdepth_minus8[MultiLayerOlsidx[output_layer_set_idx]].

The following constraints may apply for picture_width:

If the VVC stream to which the configuration record applies is a single-layer bitstream, the value of sps_pic_width_max_in_luma_samples, as defined in ISO/IEC 23090-3, shall be the same in all SPSs referenced by the VCL NAL units in the samples to which the current sample entry description applies, and the value of picture_width shall be equal to the value of sps_pic_width_max_in_luma_samples.

Otherwise (i.e. if the VVC stream to which the configuration record applies is a multi-layer bitstream), the value of vps_ols_dpb_pic_width[MultiLayerOlsidx[output_layer_set_idx]], as defined in ISO/IEC 23090-3, shall be the same for all the CVSs to which the current sample entry description applies, and the value of picture_width shall be equal to the value of vps_ols_dpb_pic_width[MultiLayerOlsIdx[output_layer_set_idx]].

The following constraints may apply for picture_height:

If the VVC stream to which the configuration record applies is a single-layer bitstream, the value of sps_pic_height_max_in_luma_samples, as defined in ISO/AEC 23090-3, shall be the same in all SPSs referenced by the VCL NAL units in the samples to which the current sample entry description applies, and the value of picture_height shall be equal to the value of sps_pic_height_max_in_luma_samples.

Otherwise (i.e. if the VVC stream to which the configuration record applies is a multi-layer bitstream), the value of vps_ols_dpb_pic_height[MultiLayerOlsIdx[output_layer_set_idx]], as defined in ISO/IEC 23090-3, shall be the same for all the CVSs to which the current sample entry description applies, and the value of picture height shall be equal to the value of vps_ols_dpb_pic_height[MultiLayerOlsIdx[output_layer_set_idx]].

In addition to other important format information used in a VVC video elementary stream, explicit indication of a chroma format and a bit depth may be provided from the VVC decoder configuration record. If color space or bit depth indications are different in VUI information of the two sequences, two different VVC sample entries may be needed.

Additionally, for example, a set of arrays delivering initialization non-VCL NAL units may be included in the VVC decoder configuration record. The NAL unit types may be limited to indicate only DCI, OPI, VPS. SPS, PPS, prefix APS, and prefix SEI NAL units. The NAL unit types being reserved by ISO/IEC 23090-3 and the present disclosure may be defined in the future, and readers may be required to ignore (or disregard) arrays having reserved NAL unit type or unauthorized values.

Meanwhile, arrays may exist in an order of DCI, OPI, VPS, SPS, PPS, prefix APS, and prefix SEI.

A syntax of the above-described VVC decoder configuration record may be as shown below is the following table.

TABLE 5

```
aligned(8) class VvcPTLRecord(num_sublayers) {
    bit(2) reserved = 0;
    unsigned int(6) num_bytes_constraint_info;
    unsigned int(7) general_profile_idc;
    unsigned int(1) general_tier_flag;
    unsigned int(8) general_level_idc;
    unsigned int(1) ptl_frame_only_constraint_flag;
    unsigned int(1) ptl_multilayer_enabled_flag;
    unsigned int(8*num_bytes_constraint_info – 2)
    general_constraint_info;
    for (i=num_sublayers – 2; i >= 0; i--)
        unsigned int(1) ptl_sublayer_level_present_flag[i];
    for (j=num_sublayers; j<=8 && num_sublayers > 1; j++)
        bit(1) ptl_reserved_zero_bit = 0;
    for (i=num_sublayers–2; i >= 0; i--)
        if (ptl_sublayer_level_present[i])
            unsigned int(8) sublayer_level_idc[i];
    unsigned int(8) num_sub_profiles;
    for (j=0; j < num_sub_profiles; j++)
        unsigned int(32) general_sub_profile_idc[j];
}
aligned(8) class VvcDecoderConfigurationRecord {
    unsigned int(8) configurationVersion = 1;
    bit(5) reserved = '11111'b;
    unsigned int(2) lengthSizeMinusOne;
    unsigned int(1) ptl_present_flag;
    if (ptl_present_flag) {
        unsigned int(16) output_layer_set_idx;
        unsigned int(16) avgFrameRate;
        unsigned int(2) constantFrameRate;
        unsigned int(3) numTemporalLayers;
        unsigned int(2) chroma_format_idc;
        unsigned int(3) bit depth minus8;
        bit(6) reserved = '111111'b;
```

TABLE 5-continued

```
        unsigned_int(16) picture_width;
        unsigned_int(16) picture_height;
        VvcPTLRecord(numTemporalLayers) track_ptl;
    }
    unsigned int(8) numOfArrays;
    for (j=0; j < numOfArrays; j++) {
        unsigned int(1) array_completeness;
        bit(2) reserved = 0;
        unsigned int(5) NAL_unit_type;
        unsigned int(16) numNalus;
```

TABLE 5-continued

```
        for (i=0; i< numNalus; i++) {
            unsigned int(16) nalUnitLength;
            bit(8*nalUnitLength) nalUnit;
        }
    }
}
```

Additionally, semantics for the syntax of the VVC decoder configuration record may be as shown below in the following table.

TABLE 6 num_bytes_constraint_info is used to specify the length of the
   general_constraint_info field. The length of the
   general_constraint_info field is num_bytes_constraint_info *8-2
   bits. The value shall be greater than 0. The value equal to 1 indicates that the
   gci_presnt_flag in the general_constraint_info( ) syntax structure represented by the
   general_constraint_info is equal to 0.
general_profile_idc, general_tier_flag, general_level_idc,
   ptl_frame_only_constraint_flag. ptl_multilayer_enabled_flag,
   general_constraint_info, sublayer_level_present[j],
   sublayer_level_idc[i], num_sub_profiles, and
   general_sub_profile_idc[j] contain the matching values for the fields of syntax
   structures general_profile_idc, general_tier_flag, general_level_idc,
   ptl_frame_only_constaint_flag, ptl_multiplayer_enabled_flag, general_constraint_info( ),
   ptl_sublayer_level_present[i], sublayer_level_idc[i], ptl_num_sub_profiles, and
   general_sub_profile[j] as defined in ISO/IEC 23090-3, for the stream to which this
   configuration record applies.
lengthSizeMinusOne plus 1 indicated that length in bytes of the NALUnitLength field
   in a VVC video stream sample in the stream to which the configuration record applies. For
   example, a size of one byte is indicated with a value of 0. The value of this field shall be
   one of 0, 1, or 3 corresponding to a length encoded with 1, 2, or 4 byes, respectively.
ptl_present_flag equal to 1 specifies that the track contains a VVC bitstream
   corresponding to the operating point specified by output_layer_set_idx and
   numTemporalLayer and all NAL units in the track belong to that opertaing point.
   ptl_present_flag equal 0 specifies that the track may not contain a VVC bitstream
   corresponding to a specific operating point, but rath may contain a VVC bitstream
   corresponding to multiple output layer sets of may contain one or more individual layers
   that do not form an output layer set or individual sublayers excluding the sublayer with
   TemporalId equal to 0.
output_layer_set_idx specified the output layer set index of an output layer set
   represented by the VVC bitstream contained in the track. the value of
   output_layer_set_idx may be used as the value of the TargetOlsIdx variable
   provided by external means or by an OPI NAL unit to the VVC decoder, as specified in
   ISO/IEC 23090-3, for decoding the bitstream contained in the track.
avgFramRate fives the average frame rate in units of frames/(256 seconds), for the stream
   to which this configuration record applies. value 0 indicates an unspecified average frame
   rate. when the track contains multiple layers and samples are reconstructed for the
   operating point specified by output_layer_set_idx and numTemporalLayers,
   this gives the average access unit rate of the bitstream of the operating point.
constantFrameRate equal to 1 indited that the stream to which this configuration record
   applies is of constant frame rate. value 2 indicates that the representation of each temporal
   layer in the stream is of constant frame rate. Value 0 indicates that the stream may or may
   not be of constant frame rate. When the track contains multiple layer and samples are
   reconstructed for the operating point specified by outout_layer_set_idx and
   numTemporalLayers, this gives the indication of whether the bitstream of the
   operating point has constant access unit rate.
numTemporalLayers greater than 1 indicates that the track to which this configuration
   record applies is temporally scalable and the contained number of temporal layers (also
   referred to as temporal sublayer or sublayer in ISO/IEC 23090-3) is equal to
   numTemporalLayers. Value 1 indicated that the track to which this configuration record
   applies is not temporally scalable. Value 0 indicates that is it unknown whether the track
   to which this configuration record applies is temporally scalable.
chroma_format_idc indicates the chroma format that applies to this track.
bit_depth_minus8 indicates the bit depth that applies to this track.
picture_width indicates the maximum picture width, in units of luma samples, that
   applies to this track.
picture_height indicates the maximum picture height, in units of luma samples, that
   applies to this track.
track_ptl specifies the profile, tier, and level of the output layer set represented by the
   VVC bitstream contained in the track.
numArrays indicates the number of arrays of NAL units of the indicated type(s).
array_completeness when equal to 1 indicates that all Nal units of the given type are
   in the following array and none are in the stream; when equal to 0 indicates that additional
   NAL units of the indicated type may be in the stream; the permitted values are constrained
   by the sample entry name.

TABLE 6-continued

NAL_unit_type indicates the type of the Nal units in the following array (which shall be
  all of that type); it takes a value as defined in ISO/IES 23090-3; it is restricted to take on
  of the values indicating a DCI, OPI, VPS, SPS, PPS, refix APS or prefix SEI NAL unit.
numNalus indicates the number of NAL units of the indicated type included in the
  configuration record for the stream to which this configuration record applies. The SEI
  array shall only contain SEI messages of a 'declarative' nature, that is, those that provide
  information about the stream as a whole. An example of such an SEI could be a user-data
  SEI.
nalUntiLength indicates the length in bytes of the NAL unit.
nalUnit contains a DCI, OPI, VPS, SPS, PPS, APS or declarative SEI NAL unit, as specified in
  ISO/IES 23090-3.

Meanwhile, the above-described media file may include in a track. That is, a bitstream including video/image data may be stored in the above-described track, thereby forming (or configuring) a media file. Types of the tracks, more specifically, types of tracks for transporting VVC elementary streams are as listed below in the following table.

VVC subpicture tracks or slices being included in a random sample of a VVC subpicture track may be contiguous in the decoding order.

The VVC non-VCL tracks and the VVC subpicture tracks may optimally deliver VVC video within a streaming application as described below. The tracks may each be trans-

TABLE 7

VVC file format defines several types of tracks as follows:
a)   VVC track A VVC track presents a VYC bitstream by including NAL units in its samples and
     sample entries and possibly by referencing other VVC tracks containing other sublayers of the
     VVC bitstream and possibly by referencing VVC subpicture tracks. When a VVC track references
     VVC subpicture track, it is referred to as a VVC base track.
b)   VVC non-VCL track: APSs, which carry ALF, LMCS, or scaling list parameters, and other non-VCL
     NAL units can be stored in and transmitted through a track that is separate from the track
     containing the VCL NAL units; this is the VVC non-VCL track.
c)   VVC subpicture tracks A VVC subpicture track contains either of the following:
         A sequence of one or more VVC subpictures.
         A sequence of one or more complete slices forming a rectangular area.
     A sample of a VVC subpicture track contains either of the following:
         One or more complete subpictures as specified in ISO/IES 23090-3 that are contiguous in
           decoding order.
         One or more complete slices as specified in ISO/IEC 23090-3 that form a rectangular area
           and are contiguous in decoding order.
     The VVC subpictures or slices included in any sample of a VVC subpicture track are coutiguous
     in decoding order.
         NOTE: VVC non-VCL tracks and VVC subpicture tracks enable an optional delivery of VVC video in
         streaming applications as follows. Those tracks can each be carried in DASH representations of their
         own, and for decoding and rendering of a subset of the tracks, the DASH representations containing the
         subset of the VVC subpicture tracks as well as the DASH representation containing the non-VCL tracks
         can be requested by the client, segment by segment. This way, redundant transmission of APSs and
         other non-VCL NAL units can be avoided.

a) VVC Track:

A VVC track may represent a VVC bitstream by including a NAL unit in a sample and/or sample entry of a VVC track, by referencing a VVC track including sublayers of another VC bitstream, or by referencing VVC subpicture tracks. In case the VVC track references VVC subpicture tracks, the VVC track may be referred to as a VVC base track.

b) VVC Non-VCL Track

APS transporting ALF, LMCS, or scaling list parameters, and other non-VCL NAL units may be stored and transmitted through a different track other than the track including the VCL NAL units. This track is an VVC non-VCL track.

c) VVC Subpicture Track

1) A subpicture track includes one of the following:

1-1) a sequence of one or more VVC subpictures 1-2) one or more complete slice sequences forming a rectangular region 2) A sample of a subpicture track includes one of the following:

2-1) one or more complete subpictures being specified in ISO/IEC 23090-3 and having a contiguous decoding order 2-2) one or more complete slices being specified in ISO/IEC 23090-3, having a contiguous decoding order and forming a rectangular region.

ported (or carried) in DASH representation of their own, wherein DASH representation including a subset of the VVC subpicture for decoding and rendering the subsets of the tracks and DASH representation including non-VCL tracks may be requested by clients for each segment. By using this method, redundant transmission of APS and other non-VCL NAL units may be prevented.

A method of reconstructing a picture unit from a sample in a VVC track that references VVC subpicture tracks may be as described below.

Meanwhile, in order to reconstruct an access unit from samples of multiple tracks carrying a multi-layer VVC bitstream, an operating point may be determined first. For example, if a VVC bitstream is represented by multiple VVC tracks, a file parser can identify the tracks needed for the chosen operating point as follows:

Select a VVC bitstream based on the 'vvcb' entity groups and the corresponding 'vopi' sample groups, as well as the 'opeg' entity groups in the file.

Select an operating point from the 'opeg' entity group or 'vopi' sample group that is suitable for the decoding capacity and application purposes.

When an 'opeg' entity group is present, it indicates that a set of tracks exactly represents the selected operating point. Thus, a VVC bitstream can be reconstructed from the set of tracks and decoded.

When an 'opeg' entity group is not present (i.e. when a 'vopi' sample group is present), determine, from the 'vvcb' entity group and the 'vopi' sample group, the set of tracks needed for decoding the selected operating point.

In order to reconstruct a bitstream from multiple VVC tracks carrying a VVC bitstream, the target highest value of TemporalId may need to be determined first. If several tracks include data for the access unit, the alignment of respective samples in tracks may be performed based on the sample decoding times. That is, the time-to-sample table may be used without considering edit lists.

When a VVC bitstream is represented by multiple VVC tracks, the decoding times of the samples shall be such that if the tracks were combined into a single stream ordered by increasing decoding time, the access unit order would be correct as specified in ISO/IEC 23090-3. Meanwhile, a sequence of access units is reconstructed from the respective samples in the required tracks according to the implicit reconstruction process. For example, an implicit reconstruction process of a VVC bitstream may be as follows.

For example, when the Operating Points Information sample group is present, the required tracks are selected based on the layers they carry and their reference layers as indicated by the Operating Points Information sample group.

In addition, for example, when the Operating Points Entity Group is present, the required tracks are selected based on the information in the OperatingPointGroupBox.

In addition, for example, when reconstructing a bitstream including a sublayer for which the VCL NAL units have TemporalId greater than 0, all lower sublayers (i.e., those for which the VCL NAL units have smaller TemporalId) within the same layer are also included in the resulting bitstream and the required tracks are selected accordingly.

In addition, for example, when reconstructing an access unit, picture units (as specified in ISO/IEC 23090-3) from samples having the same decoding time are placed into the access unit in increasing order of the nuh_layer_id value. When at least one of the multiple picture units for an access unit has an AUD NAL unit, the first picture unit (i.e., the picture unit with the smallest value of nuh_layer_id) shall have an AUD NAL unit, and only the AUD NAL unit in the first picture unit is kept in the reconstructed access unit, while other AUD NAL units, when present, are discarded. In such a reconstructed access unit, when the AUD NAL unit has aud_irap_orgdr_flag equal to 1 and the reconstructed access unit is not an IRAP or GDR access unit, the value of aud_irap_or_gdr_flag of the AUD NAL unit is set equal to 0. For example, it is possible that the AUD NAL unit in the first PU has aud_irap_or_gdr_flag with a value equal to 1, and another PU for the same access unit but in a separate track has a picture that is not an IRAP or GDR picture. In this case, for example, the value of aud_irap_or_gdr_flag of the AUD NAL unit in the reconstructed access unit may be changed from 1 to 0.

In addition, for example, when the Operating Points Entity Group is not present, the final required tracks, after selection among the tracks carrying a same layer or sublayer, could still collectively carry some layers or sublayers that do not belong to the target operating point. The reconstructed bitstream for the target operating point may not include the layers or sublayers that are carried in the final required tracks but do not belong to the target operating point. For example, VVC decoder implementations take as input a bitstream corresponding to the target output layer set index and the highest TemporalId value of the target operating point, which correspond to the TargetOlsIdx and HighestTid variables in clause 8 of ISO/IEC 23090-3, respectively. A file parser needs to ensure that the reconstructed bitstream does not include any other layers and sub-layers than those included in the target operating point before transferring the reconstructed bitstream to a VVC decoder.

In addition, for example, when reconstructing an access unit with dependent layers and max_tid_il_ref_pics_plus1 is greater than 0, only the sublayers of the reference layers for which the VCL NAL units have TemporalId less than or equal to max_tid_il_ref_pics_plus1–1 (as indicated in the operating points information sample group) within the same layer are included in the resulting bitstream and the required tracks are selected accordingly.

In addition, for example, when reconstructing an access unit with dependent layers and max_tid_il_ref_pics_plus1 is equal to 0, from all the picture units of the reference layers only IRAP picture units and GDR picture units with ph_recovery_poc_cnt having a value equal to 0 are included in the resulting bitstream and the required tracks are selected accordingly.

In addition, for example, if a VVC track includes a 'subp' track reference, each picture unit is reconstructed as specified in clause 11.6.3 with the additional constraints on EOS and EOB NAL units as specified below. The process in clause 11.6.3 is repeated for each layer of the target operating point in increasing nuh_layer_id order. Otherwise, each picture unit is reconstructed as described below.

The reconstructed access units are placed into the VVC bitstream in increasing order of decoding time, and the duplicates of EOB and EOS NAL units are removed from the VVC bitstream, as described further below.

In addition, for example, for access units that are within the same coded video sequence of a VVC bitstream and belong to different sublayers stored in multiple tracks, there may be more than one of the tracks containing an EOS NAL unit with a particular nuh_layer_id value in the respective samples. In this case, only one of the EOS NAL units shall be kept in the last of these access units (the one with the greatest decoding time) in the final reconstructed bitstream, placed after all NAL units, except the EOB NAL unit (when present), of the last of these access units, and other EOS NAL units may be discarded. Similarly, there may be one or more such tracks including an EOB NAL unit in the respective samples. In this case, only one of the EOB NAL units shall be kept in the final reconstructed bitstream, placed at the end of the last of these access units, and other EOB NAL units may be discarded.

In addition, for example, since a particular layer or sublayer may be represented by one or more tracks, when figuring out the required tracks for an operating point, a selection may need to be made among the set of tracks that all carry the particular layer or sublayer.

Meanwhile, a sample of a VVC track may be resolved to a picture unit including the following NAL units in the order of the table below.

TABLE 8

• The AUD NAL unit, when present in the sample.
  NOTE 1: When an AUD NAL unit is present in a sample, it is the first NAL unit in the sample.
• When the sample is the first sample of a sequence of samples associated with the same sample
 entry, the parameter set and SEI NAL units contained in the sample entry, if any.

TABLE 8-continued

- If there is at least one NAL unit in the sample with nal_unit_type equal to EOS_NUT, EOB_NUT,
  SUFFIX_APS_NUT, SUFFIX_SEI_NUT, FD_NUT, RSV_NVCL_27, UNSPEC_30, or UNSPEC_31 (a NAL
  unit with such a NAL unit type cannot precede the first VCL NAL unit in a picture unit), the NAL
  units in the sample up to and excluding the first of these NAL units, otherwise all NAL units in the
  sample.
- The content of the time-aligned (in decoding time) resolved sample from each referenced VVC
  subpicture track in the order of the VVC subpicture tracks being referenced in the 'subp' track
  reference (when num_subpic_ref_idx in the same group entry of the 'spor' sample group
  entry mapped to this sample is equal to 0) or in the order as specified in the 'spor' sample
  group description entry mapped to this sample (when num_subpic_ref_idx in the same
  group entry of the 'spor' sample group entry mapped to this sample is greater than 0),
  excluding all DCI, OPI, VPS, SPS, PPS, AUD, PH, EOS, EOB, and other AU-level or picture-level non-
  VCL NAL units, if any. The track references are resolved as specified below.
      NOTE 2:   If a referenced VVC subpicture track is associated with a VVC non-VCL track, the
  reached sample of the VVC subpicture track contents the non-VCL NAL unit(s), if any, of the time-aligned sample
  in the VVC non-VCL track.
- All NAL units in the sample with nal_unit_type equal to EOS_NUT, EOB_NUT, SUFFIX_APS_NUT,
  SUFFIX_SEI_NUT, FD_NUT, RSV_NVCL_27, UNSPEC_30, or UNSPEC_31.

Referring to Table 8, for example, when present in the sample, the AUD NAL unit. For example, when an AUD NAL unit is present in a sample, it is the first NAL unit in the sample.

Referring to Table 8, for example, when the sample is the first sample of a sequence of samples associated with the same sample entry, the parameter set and SEI NAL units included in the sample entry, if any.

Referring to Table 8, for example, if there is at least one NAL unit in the sample with nal_unit_type equal to EOS_NUT, EOB_NUT, SUFFIX_APS_NUT, SUF-FIX_SEI_NUT, FD_NUT, RSV_NVCL_27, UNSPEC_30, or UNSPEC_31 (a NAL unit with such a NAL unit type cannot precede the first VCL NAL unit in a picture unit), the NAL units in the sample up to and excluding the first of these NAL units, otherwise all NAL units in the sample.

Referring to Table 8, for example, all NAL units in the sample with nal_unit_type equal to EOS_NUT, EOB_NUT, SUFFIX_APS_NUT. SUFFIX_SEI_NUT, FD_NUT, RSV_NVCL_27, UNSPEC_30, or UNSPEC_31.

Meanwhile, if num_subpic_ref_idx in the 'spor' sample group description entry mapped to this sample is equal to 0, each track reference in the 'subp' box is resolved as follows. Otherwise, each instance of the track reference subp_track_ref_idx in the 'spor' sample group description entry mapped to this sample is resolved as follows. For example, each sample of the VVC base track resolved from the 'subp' track references forms a rectangular region without holes (i.e., all samples in the rectangular region are covered) and without overlaps (i.e., all samples in the rectangular region are covered only once).

TABLE 9

- If the track reference points to a track ID of a VVC subpicture track, the track reference is resolved
  to the VVC subpicture track.
- Otherwise (the track reference points to an 'alte' track group), the track reference is resolved
  to any of the tracks of the 'alte' track group, and if a paticular track reference index value was
  resolved to a paticular track in the previous sample, it shall be resolved in the current sample to
  either of the following:
  - the same particular track, or
  - any other track in the same 'alte' track group that contains a sync sample that is time-
    aligned with the current sample.
        NOTE 4:   The VVC subpicture tracks in the same 'alte' track group are necessarily independent
  of any other VVC subpicture tracks referenced by the same VVC base track to avoid decoding mismatches and could
  therefore be constrained as follows:
  - All the VVC subpicture tracks contain VVC subpictures.
  - The subpicture boundaries are like picture boundaries.

Referring to Table 8, for example, the content of the time-aligned (in decoding time) resolved sample from each referenced VVC subpicture track in the order of the VVC subpicture tracks being referenced in the 'subp' track reference or in the order as specified in the 'spor' sample group description entry mapped to this sample, excluding all DCI, OPI, VPS, SPS, PPS, AUD, PH. EOS, EOB, and other AU-level or picture-level non-VCL NAL units, if any. The track references are resolved as specified follow. If a referenced VVC subpicture track is associated with a VVC non-VCL track, the resolved sample of the VVC subpicture track includes the non-VCL NAL unit(s), if any, of the time-aligned sample in the VVC non-VCL track.

Referring to Table 9, for example, if the track reference points to a track ID of a VVC subpicture track, the track reference may be resolved to the VVC subpicture track.

Referring to Table 9, for example, otherwise (i.e., the track reference points to an 'alte' track group), the track reference may be resolved to any of the tracks of the 'alte' track group, and if a particular track reference index value was resolved to a particular track in the previous sample, it shall be resolved in the current sample to either of the following:

The same particular track, or

Any other track in the same 'alte' track group that includes a sync sample that is time-aligned with the current sample.

Referring to Table 9, for example, the VVC subpicture tracks in the same 'alte' track group may be necessarily independent of any other VVC subpicture tracks referenced by the same VVC base track to avoid decoding mismatches and may therefore be constrained as follows:

All the VVC subpicture tracks include VVC subpictures.

The subpicture boundaries are like picture boundaries.

Meanwhile, if a reader selects VVC subpicture tracks including VVC subpictures with a set of subpicture ID values that is the initial selection or differs from the previous selection, the steps in the following table may be taken.

TABLE 10

- The 'spor' sample group description entry is studied to conclude whether a PPS or SPS NAL unit needs to be changed.
    NOTE 4:   An SPS change is only possible at the start of a CLVS.
- If the 'spor' sample group description entry indicates that start code emulation prevention from the NAL unit (i.e., start code emulation prevention bytes are removed). After the overriding in the next step, start code emulation prevention is re-done.
- The reader uses the bit position and subpicture ID length information in the 'spor' sample group entry to conclude which bits are overwritten to update the subpicture IDs to the selected ones.
- When the subpicture ID values of a PPS or SPS are initially selected, the reader needs to rewrite the PPS or SPS, respectively, with the selected subpicture ID values in the reconstructed access unit.
- When the subpicture ID values of a PPS or SPS are changed compared to the previous PPS or SPS (respectively) with the same PPS ID value or SPS ID value (respectively), the reader needs to include a copy of that previous PPS and SPS (if the PPS of SPS with that same PPS of SPS ID value,
    respectively, is not present in the access unit otherwise) and rewrite the PPS or SPS (respectively) with the updated subpicture ID values in the reconstructed access unit.

Referring to Table 10, for example, the 'spor' sample group description entry may be studied to conclude whether a PPS or SPS NAL unit needs to be changed. An SPS change may only be possible at the start of a CLVS.

Referring to Table 10, for example, if the 'spor' sample group description entry indicates that start code emu- Referring to Table 10, for example, when the subpicture ID values of a PPS or SPS are initially selected, the reader may need to rewrite the PPS or SPS, respectively, with the selected subpicture ID values in the reconstructed access unit.

Referring to Table 10, for example, when the subpicture ID values of a PPS or SPS are changed compared to the previous PPS or SPS (respectively) with the same PPS ID value or SPS ID value (respectively), the reader may need to include a copy of that previous PPS and SPS and rewrite the PPS or SPS (respectively) with the updated subpicture ID values in the reconstructed access unit.

Meanwhile, when there is a 'minp' sample group description entry mapped to the sample of the VVC base track, the operations in the following table may be applied.

TABLE 11

- The 'minp' sample group description entry is studied to conclude the value of pps_mixed_nalu_types_in_pic_flag.
- If the value differs from that in the previous PPS NAL unit with the same PPS ID in the reconstructed bitstream, the following applies:
    o   When no PPS was included in the picture unit by the steps above, the reader needs to include a copy of the PPS with the updated pps_mixed_nalu_types_in_pic_flag value in the reconstructed picture unit.
    o   The reader uses the bit position in the 'minp' sample group entry to conclude which bit is overwritten to update the pps_mixed_nalu_types_in_pic_flag.

lation prevention bytes are present before or within the subpicture IDs in the containing NAL unit, an RBSP may be derived from the NAL unit (i.e., start code emulation prevention bytes are removed). After the overriding in the next step, start code emulation prevention may be re-done.

Referring to Table 10, for example, the reader uses the bit position and subpicture ID length information in the 'spor' sample group entry to conclude which bits are overwritten to update the subpicture IDs to the selected ones.

Referring to Table 11, for example, the 'minp' sample group description entry may be studied to determine the value of pps_mixed_nalu_types_inpic_flag.

Referring to Table 11, for example, if the value differs from that in the previous PPS NAL unit with the same PPS ID in the reconstructed bitstream, the following may apply:

When no PPS was included in the picture unit by the steps above, the reader needs to include a copy of the PPS with the updated pps_mixed_nalu_types_inpic_flag value in the reconstructed picture unit.

The reader uses the bit position in the 'minp' sample group entry to determine which bit is overwritten to update the pps_mixed_nalu_types_in_pic_flag.

Meanwhile, a stream access point (SAP) sample group 'sap' specified in ISO/IEC 14496-12 may be used to provide information of all SAPs.

The semantics of layer_id_method_idc equal to 0 are specified in ISO/IEC 14496-12.

When layer_id_method_idc is equal to 0, an SAP is interpreted as follows:

If the sample entry type is 'vvc1' or 'vvi1', and the track does not include any sublayer with TemporalId equal to 0, an SAP may specify access to all the sublayers present in the track.

Otherwise, an SAP may specify access to all layers present in the track.

For example, if the sample entry type is 'vvc1' or 'vvi1', and the track does not include any sub-layer with TemporalId equal to 0, an STSA picture with TemporalId equal to the lowest TemporalId present in the track serves as an SAP.

The semantics of layer_id_method_idc equal to 1 may be specified in clause 9.5.7.

A GDR picture in the VVC bitstream may generally be indicated with SAP type 4 in the 'sap' sample group.

For example, VVC may enable subpictures with different VCL NAL unit types within the same coded picture. A gradual decoding refresh may be obtained by updating subpictures of each subpicture index as an IRAP subpicture within a range of pictures. However, VVC may not specify a decoding process that would start from a picture having mixed VCL NAL unit types.

When all of the conditions in the following table 12 are true, the table 13 may apply.

TABLE 12

- a sample in a VVC track references a PPS with pps_mixed_nalu_types_in_pic_flag equal to 1, and
- for each subpicture index i in the range of 0 to sps_num_subpics_minus1, inclusive, both of the following are true:
  - sps_subpic_treated_as_pic_flag[ i ] is equal to 1 and
  - there is at least one IRAP subpicture having the same subpicture index i in or following the current sample in the same CLVS.

Referring to Table 12, the conditions may met when a sample in a VVC track references a PPS with pps_mixed_nalu_types_in_pic_flag equal to 1, and when sps_subpic_treated_as_pic_flag[i] is equal to 1 and there is at least one IRAP subpicture having the same subpicture index i in or following the current sample in the same CLVS for each subpicture index in the range of 0 to sps_num_subpics_minus1, inclusive.

TABLE 13

- the sample may be indicated to be a SAP sample of type 4, and
- the sample may be mapped to 'roll' sample group description entry with a roll_distance value that is correct for a decoding process that omits decoding of subpictures with a particular subpicture index before there is an IRAP subpicture.

Referring to Table 13, when all of the conditions in Table 12 are met, the sample may be indicated to be an SAP sample of type 4, and the sample may be mapped to a 'roll' sample group description entry with a roll_distance value that is correct for a decoding process that omits decoding of subpictures with a particular subpicture index before there is an IRAP subpicture.

When SAP sample groups are used, they shall be used on all tracks carrying the same VVC bitstream.

Meanwhile, the random access recovery point sample group 'roll' specified in ISO/IEC 14496-12 may be used to provide information on recovery points for gradual decoding refresh.

When a 'roll' sample group is used with VVC tracks, the syntax and semantics of grouping_type_parameter may be specified identically to those for the 'sap' sample group in ISO/IEC 14496-12.

layer_id_method_idc having values of 0 and 1 may be used when the pictures of the target layers of a sample that is mapped to the 'roll' sample group are GDR pictures.

When layer_id_method_idc is equal to 0, the 'roll' sample group may specify the behavior for all layers present in the track.

The semantics of layer_id_method_idc equal to 1 are specified in clause 9.5.7.

layer_id_method_idc having values of 2 and 3 may be used when not all pictures of the target layers of a sample that is mapped to the 'roll' sample group are GDR pictures, and for pictures of the target layers that are not GDR pictures, the following table may apply.

TABLE 14

- the referenced PPS has pps_mixed_nalu types_in_pic_flag equal to 1, and
- for each subpicture index i in the range of 0 to sps_num_subpics_minus1, inclusive, both of the
  following are true:
  o   sps_subpic_treated_as_pic_flag[ i ] is equal to 1 and
  o   there is at least one IRAP subpicture having the same subpicture index i in or following
      the current sample in the same CLVS.

Referring to Table 14, for example, the referenced PPS may have pps_mixed_nalu_types_in_pic_flag_with value equal to 1.

Referring to Table 14, for example, for each subpicture index i in the range of 0 to sps_num_subpics_minus1, inclusive, the 2 followings may both be true.

The value of the sps_subpic_treated_as_pic_flag[i] is equal to 1.

There is at least one IRAP subpicture having the same subpicture index i in or following the current sample in the same CLVS.

When layer_id_method_idc is equal to 2, the 'roll' sample group may specify the behavior for all layers present in the track.

The semantics of layer_id_method_idc equal to 3 are specified in clause 9.5.7.

When a reader uses a sample marked with layer_id_method_idc with a value equal to 2 or 3 for starting the decoding, the reader needs to further modify the SPS, PPS and PH NAL units of the bitstream reconstructed according to clause 11.6 as follows so that a bitstream starting with a sample marked as belonging to this sample group with layer_id_method_idc equal to 2 and 3 is a conforming bitstream:

Any SPS referred to by the sample has sps_gdr_enabled_flag with a value equal to 1.

Any PPS referred to by the sample has pps_mixed_nalu_types_in_pic_flag_with a value equal to 0.

All VCL NAL units of the AU reconstructed from the sample have nal_unit_type equal to GDR_NUT.

Any picture header of the AU reconstructed from the sample has ph_gdr_pic_flag with a value equal to 1 and a value of ph_recovery_poc_cnt corresponding to the roll_distance of the 'roll' sample group description entry to which the sample is mapped.

When a 'roll' sample group concerns a dependent layer but not its reference layer(s), the sample group may represent characteristics that apply when all the reference layers of the dependent layer are available and decoded. The sample group can be used to initiate decoding of the predicted layer.

Meanwhile, the following problems may exist in relation to the above-described signaling of the operating point.

In the previous specification, operating point information may be signaled in entity group 'opeg', in sample group 'vopi', or in sample entry of tracks. Here, it is not clear if operating point information that are signaled in 'opeg' and 'vopi' includes operating points that are present in sample entry. In relation to this, there is an argument that operating point information that are signaled in 'opeg' and 'vopi' also includes operating points that are present in sample entry so that file parser can get the operating point information all at once. On the other hand, there is another argument that it may be redundant and waste of signaling bits to include operating point information from sample entry in 'opeg' and 'vopi'.

Accordingly, the present document proposes a solution to the problem described above. The proposed embodiments can be applied individually or in combination.

1. For example, for signaling of an operating point, a method may be proposed in which a flag is present to indicate whether an operating point list includes all operating points present in sample entries of tracks.

The flag, for example, may be named op_in_sample_entry_included_flag. For example, when a value of the op_in_sample_entry_included_flag is equal to 1, it may mean that the list of operating points in the structure includes all operating points present in sample entry of tracks representing the bitstream. For example, when the value of the op_in_sample_entry_included_flag is equal to 0, it may mean that the list of operating points in the structure does not include operating points present in sample entry of tracks representing the bitstream.

In one alternative, when the value of the op_in_sample_entry_included_flag is equal to 0, it may mean that the list of operating points in the structure does not include all operating points present in sample entries of tracks representing the bitstream.

In another alternative, when the value of the op_in_sample_entry_included_flag is equal to 0, it may mean that the list of operating points in the structure may not include all operating points present in sample entry of tracks representing the bitstream.

2. In one alternative, for example, a method may be proposed in which the list of operating points in 'opeg' and 'vopi' is constrained to include all operating points present in sample entries of tracks representing the bitstream.

3. In another alternative, for example, a method may be proposed in which the list of operating points in 'opeg' and in 'vopi' is constrained not to include operating points present in sample entry of tracks representing the bitstream.

Hereinafter, the aforementioned solution will be described in more detail.

For example, as an embodiment proposed in the present document, an operating point entity group 'opeg' configured as shown in the following table may be proposed.

TABLE 15

```
aligned(8) class OperatingPointGroupBox extends
EntityToGroupBox('opeg',0,0)
{
    unsigned int(8 num_profile_tier_level_minus1;
    for (i=0; i<=num_profile_tier_level_minus1; i++)
        VvcFTLRecord(0) opeg_ptl(i);
    bit(7) reserved = 0;
    unsigned int(9) num_olss;
    for (i=0; i<num_olss) i++) {
        unsigned int(8) ptl_idx(i);
        unsigned int(9) output_layer_set_idx(i);
        unsigned int(6) layer_count(i);
        bit(1) reserved = 0;
```

TABLE 15-continued

```
        for (j=0) j<layer_count; j++) {
            unsigned int(6) layer_id(i)(j);
            unsigned int(1) is_output_layer(i)(j);
            bit(1) reserved = 0;
        }
    }
    bit(3) reserved = 0;
    unsigned int(1) op_in_sample_entry_included_flag;
    unsigned int(12) num_operating_points;
    for (i=0; i<num_operating_points; i++) {
        unsigned int(9) ols_idx;
        unsigned int(3) max_temporal_id;
        unsigned int(1) frame_rate_info_flag
        unsigned int(1) bit_rate_info_flag
        bit(5) reserved = 0;
        unsigned int(2) chroma_format_idc;
        unsigned int(3) bit_depth_minus8;
        unsigned_int(16) picture_width;
        unsigned_int(16) picture_height;
        if (frame_rate_info_flag) {
            unsigned int(16) avgFrameRate;
            bit(6) reserved = 0;
            unsigned int(2) constantFrameRate;
        }
        if (bit_rate_info_flag) {
            unsigned int(32) maxBitRate;
            unsigned int(32) avgBitRate;
        }
        unsigned int(8) entity_count;
        for (j=0; j<entity_count; j++) {
            unsigned int(8) entity_idx;
        }
    }
}
```

For example, referring to Table 15 described above, the entity group 'opeg' may include information related to a list of operating points. The information related to the list of the operating points may include, for example, sample entry included flag, number of operating points information, OLS index information, maximum temporal ID information, frame rate information flag, frame rate information, bit rate information flag, bit rate information, chroma format idc information, bit depth information, picture width information, picture height information, entity count information, and entity index information.

The sample entry included flag may be represented by, for example, a syntax element op_in_sample_entry_included_flag. The number of operating points information may be represented by, for example, a syntax element op_in_sample_entry_included_flag. The OLS index information may be represented by, for example, a syntax element ols_idx. The maximum temporal ID information may be represented by, for example, a syntax element max_temporal_id. The frame rate information flag may be represented by, for example, a syntax element frame_rate_info_flag. The frame rate information may include, for example, syntax elements avgFrameRate and constantFrameRate. The bit rate information flag may be represented by, for example, a syntax element bit_rate_info_flag. The bit rate information may include, for example, syntax elements maxBitRate and avgBitRate. The chroma format idc information may be represented by, for example, a syntax element chroma_format_idc. The bit depth information may be represented by, for example, a syntax element bit_depth_minus8. The picture width information may be represented by, for example, a syntax element picture_width. The picture height information may be represented by, for example, a syntax element picture height. The entity count information may be represented by, for example, a syntax element entity_count. The entity index information may be represented by, for example, a syntax element entity_idx.

In other words, referring to Table 15 described above, the entity group 'opeg' may include the sample entry included flag. For example, the syntax element of the sample entry included flag may be represented as op_in_sample_entry_included_flag. The entity group 'opeg' proposed in this embodiment may further include the sample entry included flag compared to the operating point entity group of Table 3 described above.

In addition, the semantics of the syntax of the operating point entity group 'opeg' proposed in this embodiment may be as shown in the following table.

TABLE 16

| |
|---|
| ... |
| op_in_sample_entry_included_flag equals 1 specifies that the list of operating points includes all operating points that are present in sample entry of tracks representing the stream. op_in_sample_entry_included_flag equals 0 specifies that the list of operating points may not include all operating points that are present in sample entry of tracks representing the stream. |
| num_operating_points: Gives the number of operating points for which the information follows. |
| ... |

For example, referring to Table 16 described above, the syntax element op_in_sample_entry_included_flag may represent whether the list of the operating points includes all operating points present in sample entry of tracks representing a stream. For example, when a value of the syntax element op_in_sample_entry_included_flag is 1, the list of the operating points may include all operating points present in the sample entry of tracks representing the stream. For example, when the value of the syntax element op_in_sample_entry_included_flag is 0, the list of the operating points may not include all operating points present in the sample entry of tracks representing the stream.

In addition, for example, as an embodiment proposed in the present document, an operating point information sample group, that is, a 'vopi' sample group may be proposed, configured as shown in the following table.

TABLE 17

```
class VvcOperatingPointsRecord {
    unsigned int(8) num_profile_tier_level_minus1;
    for (i=0; i<=num_profile_tier_level_minus1; i++) {
        unsigned int(8) ptl_max_temporal_id[i];
        VvcPTLRecord(ptl_max_temporal_id[i]+1) ptl[i];
    }
```

TABLE 17-continued

```
unsigned int(1) all_independent_layers_flag;
bit(7) reserved = 0;
if (all_independent_layers_flag){
    unsigned int(1) each_layer_is_an_ols_flag;
    bit(7) reserved = 0;
} else
    unsigned int(8) ols_mode_idc;
bit(7) reserved = 0;
unsigned int(9) num_olss;
for (i=0; i<num_olss; i++) {
    unsigned int(8) ptl_idx[i];
    unsigned int(9) output_layer_set_idx[i];
    unsigned int(8) layer_count[i];
    bit(1) reserved = 0;
    for (j=0; j<layer_count; j++) {
        unsigned int(6) layer_id[i][j];
        unsigned int(1) is_output_layer[i][j];
        bit(1) reserved = 0;
    }
}
bit(3) reserved = 0;
unsigned int(1) op_in_sample_entry_included_flag;
unsigned int(12) num_operating_points;
for (i=0; i<num_operating_points; i++) {
    unsigned int(9) ols_idx;
    unsigned int(3) max_temporal_id;
    unsigned int(1) frame_rate_info_flag
    unsigned int(1) bit_rate_info_flag
    bit(5) reserved = 0;
    unsigned int(2) chroma_format_idc;
    unsigned int(3) bit_depth_minus8;
    unsigned_int(16) picture_width;
    unsigned_int(16) picture_height;
    if (frame_rate_info_flag) {
        unsigned int(16) avgFrameRate;
        bit(6) reserved = 0;
        unsigned int(2) constantFrameRate;
    }
    if (bit_rate_info_flag) {
        unsigned int(32) maxBitRate;
        unsigned int(32 avgBitRate;
    }
}
unsigned int(8) max_layer_count;
for (i=0; i<max_layer_count; i++) {
    unsigned int(8) layerID;
    unsigned int (8 num_direct_ref_layers;
    for (j=0; j<num_direct_ref_layers; j++) {
        unsigned int(8) direct_ref_layerID;
        unsigned int(8) max_tid_il_ref_pics_plus1;
    }
}
}
``` information, bit depth information, picture width information, picture height information, entity count information, and entity index information.

The sample entry included flag may be represented by, for example, a syntax element op_in_sample_entry_included_flag. The number of operating point information may be represented by, for example, a syntax element op_in_sample_entry_included_flag. The OLS index information may be represented by, for example, a syntax element ols_idx. The maximum temporal ID information may be represented by, for example, a syntax element max_temporal_id. The frame rate information flag may be represented by, for example, a syntax element frame_rate_info_flag. The frame rate information may include, for example, syntax elements avgFrameRate and constantFrameRate. The bit rate information flag may be represented by, for example, a syntax element bit_rate_info_flag. The bit rate information may include, for example, syntax elements maxBitRate and avgBitRate. The chroma format idc information may be represented by, for example, a syntax element chroma_format_idc. The bit depth information may be represented by, for example, a syntax element bit_depth_minus8. The picture width information may be represented by, for example, a syntax element picture_width. The picture height information may be represented by, for example, a syntax element picture_height. The entity count information may be represented by, for example, a syntax element entity_count. The entity index information may be represented by, for example, a syntax element entity_idx.

In other words, referring to Table 17 described above, the 'vopi' sample group may include the sample entry included flag. For example, the syntax element of the sample entry included flag may be represented as op_in_sample_entry_included_flag. Compared to the 'vopi' sample group of Table 1 described above, the 'vopi' sample group proposed in this embodiment may further include the sample entry included flag compared to the 'vopi' sample group of Table 1 described above.

In addition, the semantics of the syntax of the 'vopi' sample group proposed in this embodiment may be as shown in the following table.

TABLE 18

```
...
op_in_sample_entry_included_flag equals 1 specifies that the list of operating points
    includes all operating points that are present in sample entry of tracks representing the
    stream. op_in_sample_entry_included_flag equals 0 specifies that the list of
    operating points may not include all operating points that are present in sample entry
of
    tracks representing the stream.
num_operating_points: Gives the number of operating points for which the
    information follows.
...
```

For example, referring to Table 17 described above, the 'vopi' sample group may include information related to a list of an operating points. The information related to the list of the operating points may include, for example, sample entry included flag, number of operating points information, OLS index information, maximum temporal ID information, frame rate information flag, frame rate information, bit rate information flag, bit rate information, chroma format idc For example, referring to Table 18 described above, the syntax element op_in_sample_entry_included_flag may represent whether the list of the operating points includes all operating points present in sample entry of tracks representing a stream. For example, when a value of the syntax element op_in_sample_entry_included_flag is 1, the list of the operating points may include all operating points present in the sample entry of tracks representing the stream. For example, when the value of the syntax element op_in_sample_entry_included_flag is 0, the list of the operating points may not include all operating points present in the sample entry of tracks representing the stream.

According to an embodiment proposed in the present document, there is an advantage in that it is possible to clarify whether the operating point information signaled through 'opeg' and 'vopi' includes operating points present in the sample entry using the sample entry included flag.

For example, as another embodiment proposed in this document, constraints as shown in the following table may be set.

TABLE 19

...
  num_operating_points: Gives the number of operating points for which the
    information follows. The list of operating points shall include all operating points that are
    present in sample entry of tracks representing the stream.
...

In one embodiment, for example, referring to Table 19 described above, a list of operating points of 'opeg' and 'vopi' may be constrained to include all operating points present in sample entry of the tracks representing the bitstream.

The constraint may be made, for example, through information on a number of operating points included in 'opeg' and 'vopi'. That is, for example, the information on the number of the operating points which can be represented by the syntax element num_operating_points may represent the number of operating points and at the same time represent that the list of the operating points includes all operating points present in the sample entry of the tracks.

According to the above embodiment, there is an advantage in that it is possible to clarify whether operating point information signaled through 'opeg' and 'vopi' includes operating points present in the sample entry through the constraints.

For example, as another embodiment proposed in the present document, constraints as shown in the following table may be set.

TABLE 20

...
  num_operating_points: Gives the number of operating points for which the
    information follows. The list of operating points excludes operating points that are present
    in sample entry of tracks representing the stream.
...

In one embodiment, for example, referring to Table 20 described above, there may be a constraint so that a list of operating points of 'opeg' and 'vopi' does not include operating points present in sample entry of tracks representing bitstreams.

The constraint may be made, for example, through information on a number of operating points included in 'opeg' and 'vopi'. That is, for example, the information on the number of the operating points which can be represented by the syntax element num_operating_points may represent the number of operating points and at the same time represent that the list of the operating points does not include operating points present in the sample entry of the track.

According to the above embodiment, there is an advantage in that it is possible to clarify whether operating point information signaled through 'opeg' and 'vopi' includes operating points present in the sample entry through the constraints.

Figure 8:
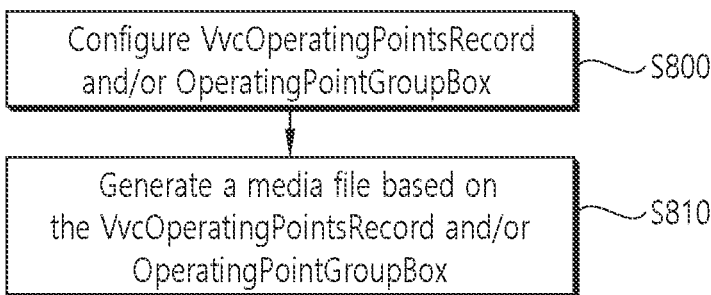

FIG. 8 shows an example of a method for generating a media file to which the embodiment proposed in the present document is applied.

Referring to FIG. 8, a first device may configure VvcOperatingPointsRecord (an operating point information sample group) and/or OperatingPointGroupBox (an operating point entity group) (S800). For example, the first device may represent a transmission end, an encoding end, or a media file generating end. For example, the first device may obtain encoded image/video information through a network or a (digital) storage medium. Here, the network may include a broadcasting network and/or a communication network, and the digital storage medium may include various storage media such as USB, SD, CD, DVD, Blu-ray, HDD, SSD, and etc. In addition, the first device may include an encoder and derive the encoded image/video information. Then, the first device may configure VvcOperatingPointsRecord (an operating point information sample group, i.e., 'opeg' entity group) and/or OperatingPointGroupBox (an operating point entity group, i.e., 'vopi' sample group). For example, the first device may configure VvcOperatingPointsRecord and/or OperatingPointGroupBox for the encoded image/video information according to the above-described embodiment.

Thereafter, the first device may generate a media file based on the VvcOperatingPointsRecord and/or OperatingPointGroupBox (S810).

Figure 9:
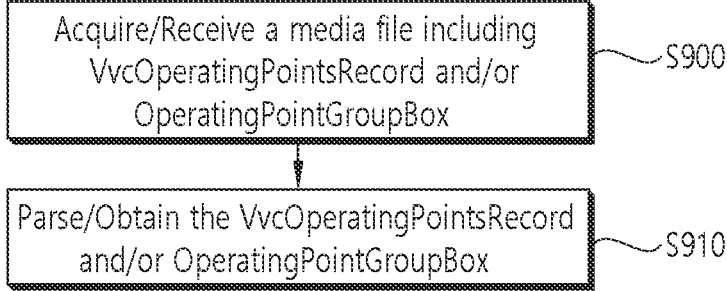
FIG. 9 shows an example of a method for processing a media file that is generated by applying the embodiment proposed in the present disclosure is applied.

FIG. 9 exemplarily illustrates a method of processing a media file generated by applying an embodiment proposed in the present document.

The second device may acquire/receive a media file including VvcOperatingPointsRecord and/or OperatingPointGroupBox (S900). For example, the second device may represent a reception end, a decoding end, or a rendering end.

For example, a media file may include information described in Table 1, Table 3, Table 15, and/or Table 17. For example, the VvcOperatingPointsRecord and/or the OperatingPointGroupBox may include information/fields of the embodiment(s) proposed in the present document.

The second device may parse/obtain the VvcOperatingPointsRecord and/or OperatingPointGroupBox (S910). The second device may parse/obtain the VvcOperatingPointsRecord and/or OperatingPointGroupBox included in the media file. For example, the VvcOperatingPointsRecord and/or OperatingPointGroupBox may include information related to operating points (or, for example, information related to a list of operating points), and the second device may determine the operating points (or for example, a list of operating points) based on the VvcOperatingPointsRecord and/or OperatingPointGroupBox. Based on the derived operating points (or, for example, the list of the operating points), image/video decoding and/or (decoded) picture output may be performed.

Figure 10:
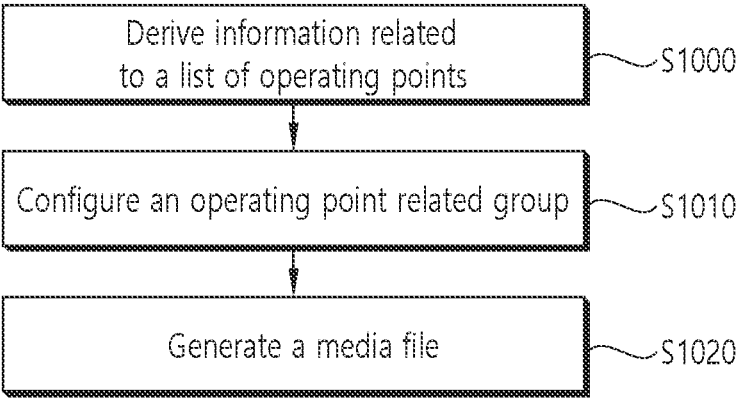
FIG. 10 shows a general view of a method for generating a media file performed by an apparatus for generating a media file according to the present disclosure.

FIG. 10 schematically shows a media file generating method by a media file generating apparatus according to the present document. The method described in FIG. 10 may be performed by the media file generating apparatus disclosed in FIG. 11. The media file generating apparatus may represent the above-described first device. Specifically, for example, S1000 to S1010 of FIG. 10 may be performed by an image processer of the media file generating apparatus, and S1020 may be performed by a media file generator of the media file generating apparatus. Also, although not shown in the drawing, a process of encoding a bitstream including image information may be performed by an encoder of the media file generating apparatus. The bitstream may include a Versatile Video Coding (VVC) bitstream.

The media file generating apparatus may derive information related to a list of operating points (S1000). The information related to the list of the operating points may include, for example, information needed to derive an operating point. The information related to the list of the operating points may include, for example, index information related to OLS (Output Layer Set) and information related to a maximum temporal id. Each of the operating points may be associated with an OLS, a maximum temporal id and a PTL (profile, tier and level).

For example, the information related to the list of the operating points may include specific information related to whether the list of the operating points includes operating points present in a sample entry of tracks. For example, the information related to the list of the operating points may include specific information representing that the list of the operating points includes all operating points present in the sample entry of the tracks.

For example, the specific information may represent that the list of the operating points includes all operating points present in the sample entry of the tracks. In other words, if the specific information represents that the list of the operating points includes all operating points present in the sample entry of the tracks, the list of the operating points includes all operating points present in the sample entry of the tracks.

For example, the specific information may include information on a number of operating points. As shown in Table 19 above, the information on the number of the operating points may represent the number of operating points and at the same time represent that the list of the operating points includes all operating points present in the sample entry of the tracks.

For example, the specific information may represent that the list of the operating points does not include operating points present in sample entry of the tracks. In other words, if the specific information represents that the list of the operating points does not include operating points present in the sample entry of the tracks, the list of the operating points does not include the operating points present in the sample entry of the tracks.

For example, the specific information may include information on a number of operating points. As shown in Table 20 above, the information on the number of the operating points may represents the number of operation points, and at the same time, represents that the list of the operating points does not include operating points present in the sample entry of the tracks.

For example, the specific information may include a flag. As shown in Tables 16 and 18, the flag may be represented by a syntax element op_in_sample_entnv_included_flag, and may represent whether the list of the operating points is present in the sample entry of the tracks. The flag may be called, for example, a sample entry included flag. When a value of the flag is 1, the list of the operating points may include all operation points present in the sample entry of the tracks. When the value of the flag is 0, the list of the operating points may not include all operation points present in the sample entry of the tracks.

The media file generating apparatus may configure an operating point related group (S1010). The operating point related group may include, for example, an operating point entity group (i.e., 'opeg' entity group) and/or an operating point information sample group (i.e., 'vopi' sample group). The operating point related group may include, for example, the information related the list of the operating points described above.

The media file generating apparatus may generate a media file including the operating point related group (S1020).

Meanwhile, although it is not shown in the drawing, the media file generating apparatus may store the generated media file in a (digital) storage medium or may deliver the generated media file to a media file processing apparatus through a network or a (digital) storage medium. Herein, a network may include a broadcasting network and/or a communication network, and a digital storage medium may include various storage media, such as USB, SD, CD, DVD, Blu-ray, HDD, SSD, and so on.

Figure 11:
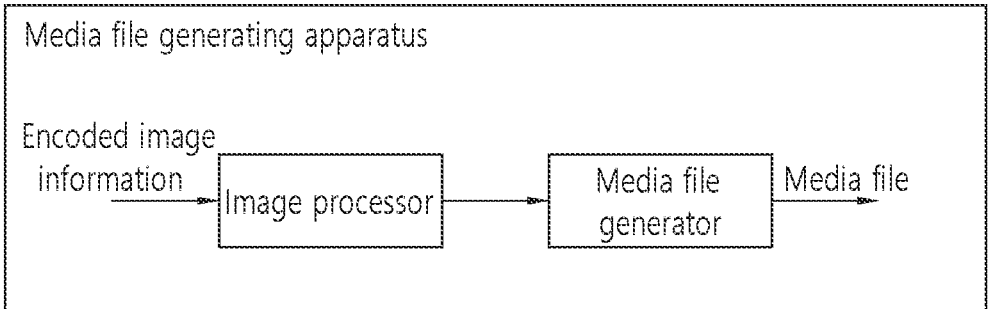
FIG. 11 shows a general view of a apparatus for generating a media file performing a method for generating a media file according to the present disclosure.

FIG. 11 shows a general view of an apparatus for generating a media file performing a method for generating a media file according to the present disclosure. The method disclosed in FIG. 10 may be performed by an apparatus for generating a media file (or media file generating apparatus), which is disclosed in FIG. 11. More specifically, for example, an image processor of the media file generating apparatus of FIG. 11 may perform S1000 to S1010 of FIG. 10, and a media file generator of the media file generating apparatus of FIG. 11 may perform S1020. Additionally, although it is not shown in the drawing, a process of encoding a bitstream, which includes image information may be performed by an encoder of the media file generating apparatus.

Figure 12:
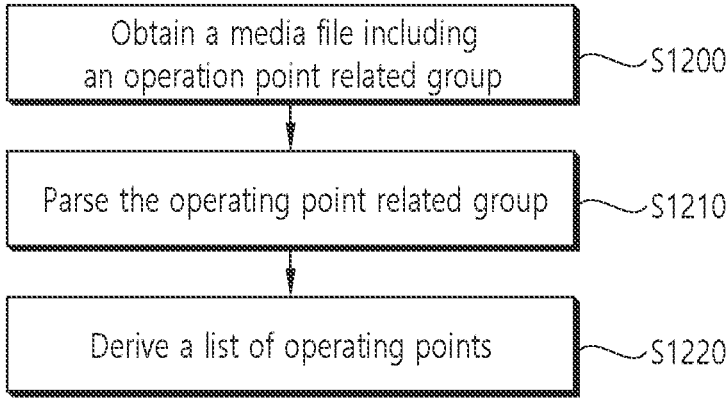
FIG. 12 shows a general view of a method for processing a media file performed by an apparatus for processing a media file according to the present disclosure.

FIG. 12 schematically shows a media file processing method by a media file processing apparatus according to the present document. The method described in FIG. 12 may be performed by the media file processing apparatus described in FIG. 13. The media file processing apparatus may represent the aforementioned second device. Specifically, for example, S1200 of FIG. 12 may be performed by the receiver of the media file processing apparatus, and S1210 and S1220 may be performed by the media file processer of the media file processing apparatus. Also, although not shown in the drawing, a process of decoding a bitstream based on a decoder configuration record may be performed by the decoder of the media file processing apparatus. The bitstream may include a Versatile Video Coding (VVC) bitstream.

The media file processing apparatus may obtain a media file including an operation point related group (S1200). The operating point related group may include, for example, an operating point entity group (i.e., 'opeg' entity group) and/or an operating point information sample group (i.e., 'vopi' sample group). The operating point related group may include, for example, information related to the list of the operating points. The information related to the list of the operating points may include, for example, index information related to OLS (Output Layer Set) and information related to a maximum temporal id. Each of the operating points may be associated with an OLS, a maximum temporal id and a PTL (profile, tier and level).

The media file processing apparatus may parse the operating point related group (S1210). The parsing of the operating point related group (S1210) may include parsing the information related to the list of the operating points.

For example, the information related to the list of the operating points may include specific information related to whether the list of the operating points includes operating points present in a sample entry of tracks. For example, the information related to the list of the operating points may include specific information representing that the list of the operating points includes all operating points present in the sample entry of the tracks.

For example, the specific information may represent that the list of the operating points includes all operating points present in the sample entry of the tracks. In other words, if the specific information represents that the list of the operating points includes all operating points present in the sample entry of the tracks, the list of the operating points includes all operating points present in the sample entry of the tracks.

For example, the specific information may include information on a number of operating points. As shown in Table 19 above, the information on the number of operating points may represent the number of operating points, and at the same time, represent that the list of the operating points includes all operating points present in the sample entry of the tracks.

For example, the specific information may represent that the list of the operating points does not include operating points present in the sample entry of the tracks. In other words, if the specific information represents that the list of the operating points does not include operating points present in the sample entry of the tracks, the list of the operating points does not include the operating points present in the sample entry of the tracks.

For example, the specific information may include information on a number of operating points. As shown in Table 20 above, the information on the number of operating points may represent the number of the operating points, and at the same time, represent that the list of the operating points does not include operating points present in the sample entry of the tracks.

For example, the specific information may include a flag. As shown in Tables 16 and 18 described above, the flag may be represented by a syntax element op_in_sample_entry_included_flag, and may represent whether the list of the operating points is present in the sample entry of the track. The flag may be called, for example, a sample entry included flag. When the value of the flag is 1, the list of the operating points may include all operating points present in the sample entry of the tracks. When the value of the flag is 0, the list of the operating points may not include all operating points present in the sample entry of the tracks.

The media file processing apparatus may derive the list of the operating points based on information related to the operating points (S1220).

Meanwhile, although not shown in the drawing, the media file processing apparatus may decode a bitstream based on the decoder configuration record. For example, the media file processing apparatus may decode the image information in the bitstream for the operating point information sample group and/or the operating point entity group based on information included in the operating point information sample group (i.e., 'vopi' sample group) and/or the operating point entity group (i.e., 'opeg' entity group), and generate a reconstructed picture based on the image information.

Figure 13:
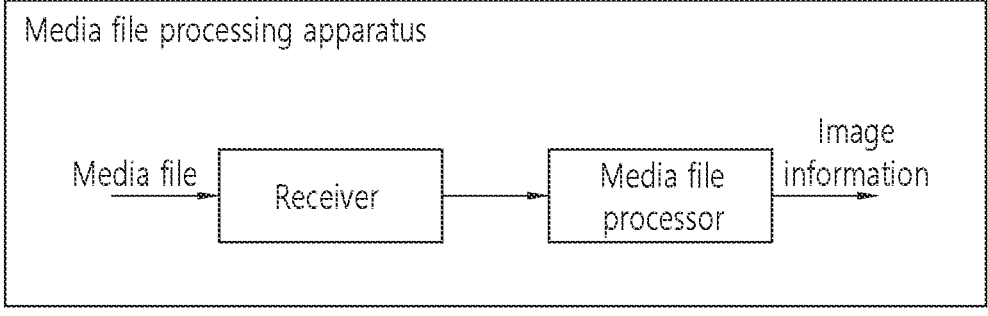
FIG. 13 shows a general view of a apparatus for processing a media file performing a method for processing a media file according to the present disclosure.

FIG. 13 shows a general view of a media file processing apparatus performing a media file processing method according to the present document. The method disclosed in FIG. 12 may be performed by an apparatus for processing a media file (or media file processing apparatus), which is disclosed in FIG. 13. More specifically, for example, a receiver of the media file processing apparatus of FIG. 13 may perform S1200 of FIG. 12, and a media file processor of the media file processing apparatus of FIG. 13 may perform S1210 and S1220 of FIG. 12. Meanwhile, although it is not shown in the drawing, the media file processing apparatus may include a decoder, and the decoder may decode a bitstream based on the operating point information sample group and/or the operating point entity group.

According to an embodiment proposed in the present document, there is an advantage in that it is possible to clarify whether operating point information signaled through 'opeg' and 'vopi' includes operating points present in the sample entry. In addition, according to the embodiment proposed in the present document, the file parser can use the operating point included in 'opeg' or 'vopi' as it is, and there is no need to consider additional operating points that may present elsewhere, so the operating point determining process may be simplified.

In the above-described embodiments, the methods are explained on the basis of flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The embodiments described in the present document may be embodied and performed on a processor, a microprocessor, a controller or a chip. For example, function parts shown in each drawing may be embodied and performed on a computer, a processor, a microprocessor, a controller or a chip. In this case, information for implementation (ex. information on instructions) or an algorithm may be stored in a digital storage medium.

Furthermore, the apparatus to which this document is applied may be included in a multimedia broadcasting transmission and reception apparatus, a mobile communication terminal, a home cinema video apparatus, a digital cinema video apparatus, a camera for monitoring, a video dialogue apparatus, a real-time communication apparatus such as video communication, a mobile streaming apparatus, a storage medium, a camcorder, a video on-demand (VoD) service provision apparatus, an over the top (OTT) video apparatus, an Internet streaming service provision apparatus, a three-dimensional (3D) video apparatus, a video telephony apparatus, transportation means terminal (e.g., a vehicle terminal, an aircraft terminal, and a vessel terminal), and a medical video apparatus, and may be used to process a video signal or a data signal. For example, the over the top (OTT) video apparatus may include a game console, a Blueray player. Internet access TV, a home theater system, a smartphone, a tablet PC, and a digital video recorder (DVR).

Furthermore, the processing method to which this document is applied may be produced in the form of a program executed by a computer, and may be stored in a computer-readable recording medium. Multimedia data having a data structure according to this document may also be stored in a computer-readable recording medium. The computer-readable recording medium includes all types of storage apparatus in which computer-readable data is stored. The computer-readable recording medium may include Blueray disk (BD), a universal serial bus (USB), a ROM, a PROM, an EPROM, an EEPROM, a RAM, a CD-ROM, a magnetic tape, a floppy disk, and an optical data storage apparatus, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of this document may be implemented as a computer program product using program code. The program code may be performed by a computer according to an embodiment of this document. The program code may be stored on a carrier readable by a computer.

Figure 14:
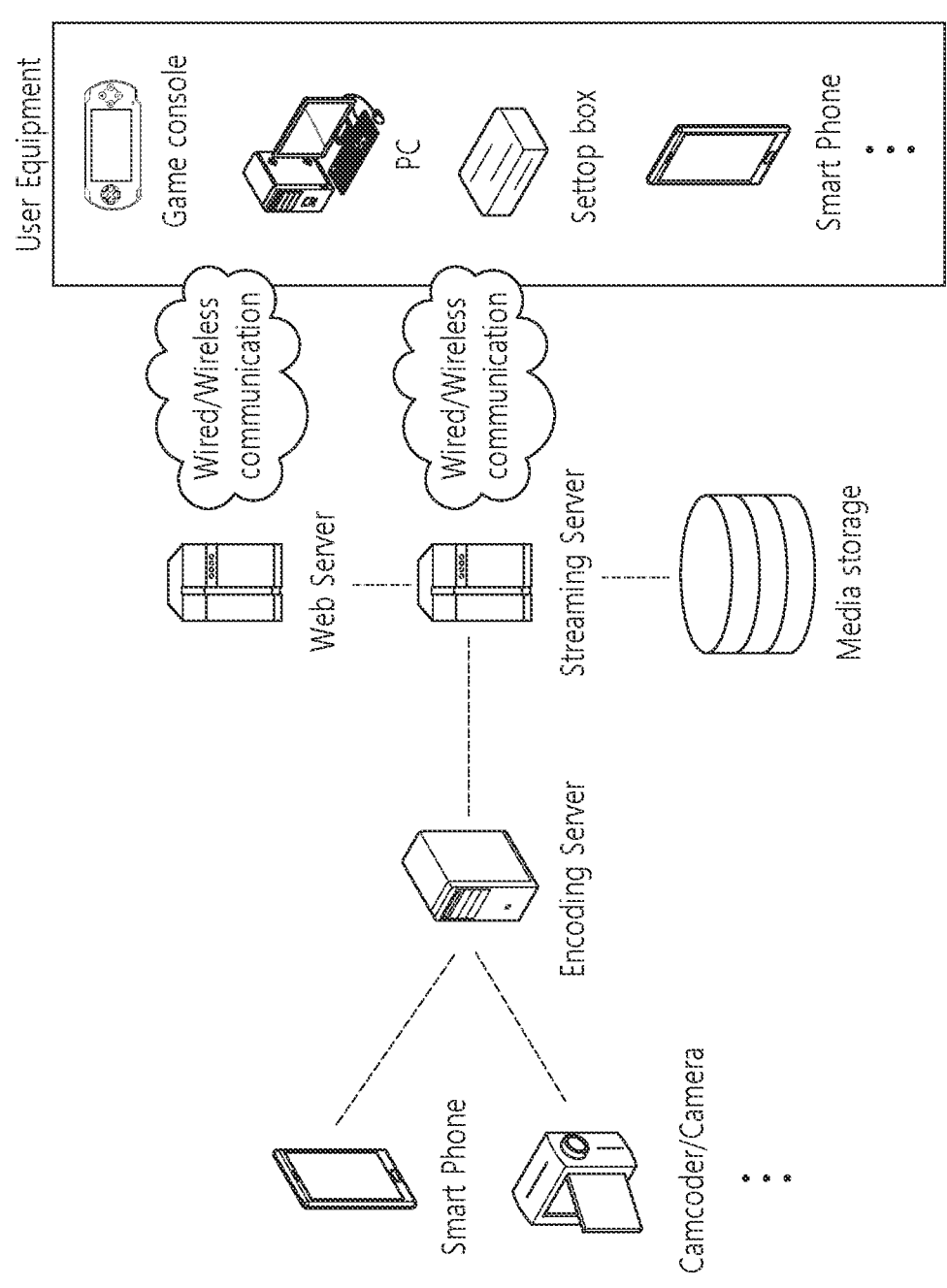
FIG. 14 illustrates an exemplary structural diagram of a content streaming system to which embodiments disclosed in the present document are applied.

FIG. 14 illustrates an example of a content streaming system to which embodiments disclosed in this document may be applied.

The content streaming system to which the embodiments of the present document are applied may basically include an encoding server, a streaming server, a web server, a media storage, a user apparatus, and a multimedia input apparatus.

The encoding server compresses content input from multimedia input apparatus such as a smartphone, a camera, a camcorder, etc. into digital data to generate a bitstream and transmit the bitstream to the streaming server. As another example, when the multimedia input apparatus such as smartphones, cameras, camcorders, etc. directly generate a bitstream, the encoding server may be omitted.

The bitstream may be generated by an encoding method or a bitstream generating method to which the embodiment(s) of the present document is applied, and the streaming server may temporarily store the bitstream in the process of transmitting or receiving the bitstream.

The streaming server transmits the multimedia data to the user apparatus based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between apparatus in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user apparatus may include a mobile phone, a smartphone, a laptop computer, a digital broadcasting terminal, a personal digital assistant (PDA), a portable multimedia player (PMP), navigation, a slate PC, tablet PCs, ultrabooks, wearable apparatus (ex. smartwatches, smart glasses, head mounted displays), digital TVs, desktops computer, digital signage, and the like. Each server in the content streaming system may be operated as a distributed server, in which case data received from each server may be distributed.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claims of the present specification and the technical features of the apparatus claims may be combined to be implemented as an apparatus, and the technical features of the method claims and the technical features of the apparatus claims of the present specification may be combined and implemented as a method.

What is claimed is:

1. A method for generating a media file, the method comprising:

deriving information related to a list of operating points;

configuring an operating point related group comprising the information related to the list of the operating points; and generating a media file comprising the operating point related group, wherein the information related to the list of the operating points includes specific information specifying that the list of operating points includes all operating points present in a sample entry of tracks representing bitstream, and wherein the operating point related group includes an operating point entity group or an operating points information sample group, wherein the specific information includes information on a number of the operating points, and wherein the information on the number of the operating points specifies that the list of operating points includes all operating points present in the sample entry of tracks representing the bitstream by representing the number of the operating points.

2. The method of claim 1, wherein the information related to the list of the operating points includes index information related to Output Layer Set (OLS) and information related to maximum temporal id.

3. The method of claim 1, wherein each of the operating points is related to an OLS, a maximum temporal id, a PTL (profile, tier, and level).

4. The method of claim 1, wherein the bitstream includes VVC (Versatile Video Coding) bitstream.

5. A media file generating apparatus comprising:

a memory; and at least one processor operatively connected to the memory and configured to:

derive information related to a list of operating points;

configure an operating point related group comprising the information related to the list of the operating points; and generate a media file comprising the operating point related group, wherein the information related to the list of the operating points includes specific information specifying that the list of operating points includes all operating points present in a sample entry of tracks representing bitstream, wherein the operating point related group includes an operating point entity group or an operating points information sample group, wherein the specific information includes information on a number of the operating points, and wherein the information on the number of the operating points specifies that the list of operating points includes all operating points present in the sample entry of tracks representing the bitstream by representing the number of the operating points.

6. A method for media file processing, the method comprising:

obtaining a media file comprising an operating point related group, wherein the operating point related group includes information related to a list of operating points;

parsing the operating point related group, wherein the parsing the operating point related group includes parsing the information related to the list of the operating points; and deriving the list of the operating points based on the information related to the list of the operating points, wherein the information related to the list of the operating points includes specific information specifying that the list of operating points includes all operating points present in a sample entry of tracks representing bitstream, wherein the operating point related group includes an operating point entity group or an operating points information sample group, wherein the specific information includes information on a number of the operating points, and wherein the information on the number of the operating points specifies that the list of operating points includes all operating points present in the sample entry of tracks representing the bitstream by representing the number of the operating points.

7. The method of claim 6, wherein the information related to the list of the operating points includes index information related to Output Layer Set (OLS) and information related to maximum temporal id.

8. The method of claim 6, wherein each of the operating points is related to an OLS, a maximum temporal id, a PTL (profile, tier, and level).

9. The method of claim 6, wherein the bitstream includes VVC (Versatile Video Coding) bitstream.

10. A media file processing apparatus comprising:

a memory; and at least one processor operatively connected to the memory and configured to:

obtain a media file comprising an operating point related group, wherein the operating point related group includes information related to a list of operating points;

parse the operating point related group, wherein the parsing the operating point related group includes parsing the information related to the list of the operating points; and derive the list of the operating points based on the information related to the list of the operating points, wherein the information related to the list of the operating points includes specific information specifying that the list of operating points includes all operating points present in a sample entry of tracks representing bitstream, wherein the operating point related group includes an operating point entity group or an operating points information sample group, wherein the specific information includes information on a number of the operating points, and wherein the information on the number of the operating points specifies that the list of operating points includes all operating points present in the sample entry of tracks representing the bitstream by representing the number of the operating points.

* * * * *